United States Patent
Burkhardt et al.

(10) Patent No.: US 11,374,260 B2
(45) Date of Patent: Jun. 28, 2022

(54) NONAQUEOUS ELECTROLYTE COMPOSITIONS COMPRISING FLUORINATED SULFONES

(71) Applicant: SOLVAY SA, Brussels (BE)

(72) Inventors: Stephen E. Burkhardt, Wilmington, DE (US); Kostantinos Kourtakis, Media, PA (US); Mark Gerrit Roelofs, Earleville, MD (US)

(*) Notice: Subject to any disclaimer, the term of this patent is extended or adjusted under 35 U.S.C. 154(b) by 485 days.

(21) Appl. No.: 16/305,438

(22) PCT Filed: Jun. 3, 2016

(86) PCT No.: PCT/US2016/035734
§ 371 (c)(1),
(2) Date: Nov. 29, 2018

(87) PCT Pub. No.: WO2017/209762
PCT Pub. Date: Dec. 7, 2017

(65) Prior Publication Data
US 2020/0321657 A1    Oct. 8, 2020

(51) Int. Cl.
*H01M 10/0525* (2010.01)
*H01M 10/0567* (2010.01)
(Continued)

(52) U.S. Cl.
CPC ....... *H01M 10/0569* (2013.01); *H01M 4/505* (2013.01); *H01M 4/525* (2013.01);
(Continued)

(58) Field of Classification Search
CPC ......... H01M 10/0569; H01M 10/0525; H01M 10/0567; H01M 10/0568; H01M 4/505; H01M 4/525
See application file for complete search history.

(56) References Cited

U.S. PATENT DOCUMENTS 7,833,666 B2   11/2010   Angell et al.
8,097,368 B2   1/2012    Chiga et al.
(Continued)

FOREIGN PATENT DOCUMENTS

EP   2 631 988 A1   8/2013
JP   3444607 B2     9/2003
(Continued)

OTHER PUBLICATIONS

Xu Kang et al.: "Sulfone-Based Electrolytes for Lithium-Ion Batteries", Journal of the Electrochemical Society, The Electrochemical Society Inc., vol. 149, No. 7, 2002, pp. A920-A926.
Wachtler Mario et al.: "The behaviour of graphite, carbon black, and Li4Ti5O12 in LiBOB-based electrolytes", Journal of Applied Electrochemistry, (2006) vol. 36, pp. 1199-1206.
(Continued)

*Primary Examiner* — Osei K Amponsah
(74) *Attorney, Agent, or Firm* — Osha Bergman Watanabe & Burton LLP

(57) ABSTRACT

Disclosed herein are electrolyte compositions comprising a fluorinated solvent, a fluorinated sulfone, at least one component selected from a borate salt, and/or an oxalate salt, and/or a fluorinated cyclic carbonate, and at least one electrolyte salt. The fluorinated solvent may be a fluorinated acyclic carboxylic acid ester, a fluorinated acyclic carbonate, a fluorinated acyclic ether, or combinations thereof. The electrolyte compositions are useful in electrochemical cells, such as lithium ion batteries.

16 Claims, 4 Drawing Sheets

(51) Int. Cl.
*H01M 10/0568* (2010.01)
*H01M 10/0569* (2010.01)
*H01M 4/505* (2010.01)
*H01M 4/525* (2010.01)

(52) U.S. Cl.
CPC ... *H01M 10/0525* (2013.01); *H01M 10/0567* (2013.01); *H01M 10/0568* (2013.01); *H01M 2300/0034* (2013.01)

(56) References Cited

U.S. PATENT DOCUMENTS

| | | | |
|---|---|---|---|
| 2006/0078801 | A1 | 4/2006 | Yamaguchi et al. |
| 2008/0166637 | A1 | 7/2008 | Inagaki et al. |
| 2010/0035162 | A1 | 2/2010 | Chiga et al. |
| 2010/0273064 | A1 | 10/2010 | Jeon et al. |
| 2012/0244425 | A1* | 9/2012 | Tokuda ............. H01M 10/0564 429/199 |
| 2013/0224606 | A1 | 8/2013 | Koh et al. |
| 2014/0017559 | A1 | 1/2014 | Kawasaki et al. |
| 2014/0134501 | A1* | 5/2014 | Li ...................... H01M 10/052 429/339 |
| 2015/0140443 | A1 | 5/2015 | Takahashi et al. |
| 2016/0099486 | A1 | 4/2016 | Noguchi et al. |
| 2016/0181661 | A1* | 6/2016 | Dubois ............. H01M 10/0525 429/163 |
| 2018/0090790 | A1* | 3/2018 | Nakatsutsumi ...... C01G 45/006 |

FOREIGN PATENT DOCUMENTS

| | | |
|---|---|---|
| JP | 2006-114285 A | 4/2006 |
| JP | 2007165125 A2 | 6/2007 |
| JP | 2008147118 A2 | 6/2008 |
| JP | 4328915 B2 | 9/2009 |
| JP | 2010-62132 A | 3/2010 |
| JP | 2012-087092 A | 5/2012 |
| JP | 2013051342 A2 | 3/2013 |
| JP | 2013219187 A2 | 10/2013 |
| WO | 2012053395 A1 | 4/2012 |
| WO | 2013/183655 A1 | 12/2013 |
| WO | 2014080870 A1 | 5/2014 |
| WO | 2014-181877 A1 | 11/2014 |

OTHER PUBLICATIONS

Wietelmann Ulrich et al.: "Tris(oxalato)phosphorus Acid and Its Lithium Salt", Chem. Eur. J., 2004, vol. 10, pp. 2451-2458.

* cited by examiner

NONAQUEOUS ELECTROLYTE COMPOSITIONS COMPRISING FLUORINATED SULFONES

This application is a U.S. national phase entry under 35 U.S.C. § 371 of International Application No. PCT/US2016/035734, filed on Jun. 3, 2016, the entirety of which is explicitly incorporated herein by this reference.

FIELD OF DISCLOSURE

The disclosure herein relates to electrolyte compositions comprising a fluorinated solvent, a fluorinated sulfone, at least one component selected from a borate salt, and/or an oxalate salt, and/or a fluorinated cyclic carbonate, and at least one electrolyte salt. The electrolyte compositions are useful in electrochemical cells, such as lithium ion batteries.

BACKGROUND

Carbonate compounds are currently used as electrolyte solvents for non-aqueous batteries containing electrodes made from alkali metals, alkaline earth metals, or compounds comprising these metals, for example lithium ion batteries. Current lithium ion battery electrolyte solvents typically contain one or more linear carbonates, such as ethyl methyl carbonate, dimethyl carbonate, or diethylcarbonate; and a cyclic carbonate, such as ethylene carbonate. However, at cathode potentials above about 4.2 V these electrolyte solvents can decompose, which can result in a loss of battery performance.

Various approaches have been investigated to overcome the limitations of commonly used non-aqueous electrolyte solvents. For example, additives such as cyclic carboxylic acid anhydrides have been used in combination with the currently used electrolyte solvents (see, for example, Jeon et al. U.S. Patent Application Publication No. 2010/0273064 A1). Additionally, various fluorinated carboxylic acid ester electrolyte solvents have been investigated for use in lithium ion batteries (see, for example, Nakamura et al. in JP 4/328,915-B2, JP 3/444,607-B2, and U.S. Pat. No. 8,097,368). Although these electrolyte solvents can be used in lithium ion batteries having high potential cathodes, such as the 4 V spinel $LiMn_2O_4$ cathode, or $LiCoO_2$ or $LiNi_xMn_y$-$Co_zO_2$ where x+y+z is about 1, or the 4.7 V $LiMn_{1.5}Ni_{0.5}O_4$ cathode, cycling performance can be limited, particularly at high temperatures.

There remains a need for electrolyte solvents, and compositions thereof, that will have improved cycling performance at high temperature when used in a lithium ion battery, particularly such a battery that operates at high voltage (i.e. up to about 5 V), or that incorporates a high voltage cathode.

SUMMARY

In one embodiment, there is provided herein an electrolyte composition comprising:
a) a fluorinated solvent;
b) a fluorinated sulfone;
c) at least one component selected from
i) a borate salt represented by Formula (IX)

$$LiBF_{(4-2p)}(C_2O_4)_p \quad (IX)$$

wherein p is 0, 1, or 2; and/or
ii) an oxalate salt represented by Formula (X)

$$LiBF_{(6-2q)}(C_2O_4)_q \quad (X)$$

wherein q is 1, 2, or 3; and/or
iii) a fluorinated cyclic carbonate;
and
d) at least one electrolyte salt.

In one embodiment, the fluorinated solvent is:
a) a fluorinated acyclic carboxylic acid ester represented by Formula (I):

$$R^1—COO—R^2 \quad (I)$$

b) a fluorinated acyclic carbonate represented by Formula (II):

$$R^3—OCOO—R^4, \quad (II)$$

c) a fluorinated acyclic ether represented by Formula (III):

$$R^5—O—R^6, \quad (III)$$

or mixtures thereof;
wherein
i) $R^1$ is H, an alkyl group, or a fluoroalkyl group;
ii) $R^3$ and $R^5$ is each independently a fluoroalkyl group and can be either the same as or different from each other;
iii) $R^2$, $R^4$, and $R^6$ is each independently an alkyl group or a fluoroalkyl group and can be either the same as or different from each other;
iv) either or both of $R^1$ and $R^2$ comprises fluorine; and
v) $R^1$ and $R^2$, $R^3$ and $R^4$, and $R^5$ and $R^6$, each taken as a pair, comprise at least two carbon atoms but not more than seven carbon atoms.

In one embodiment, the fluorinated sulfone is represented by Formula (IV):

$$R^7—SO_2—R^8 \quad (IV)$$

wherein $R^7$ is a $C_1$ to $C_{10}$ fluoroalkyl group, optionally comprising one or more ether oxygens, and $R^8$ is a $C_1$ to $C_{10}$ alkyl group or a C1 to Co fluoroalkyl group, each optionally comprising one or more ether oxygens.

In another embodiment, the fluorinated sulfone is represented by Formula (V):

$$CF_2H—R^9—SO_2—R^1 \quad (V)$$

wherein $R^9$ is optionally absent, or a $C_1$ to $C_{10}$ alkylene group, or a $C_1$ to $C_{10}$ fluoroalkylene group, each group optionally comprising one or more ether oxygens; and $R^1$ is a $C_1$ to $C_{10}$ alkyl group or a $C_1$ to $C_{10}$ fluoroalkyl group, each optionally comprising one or more ether oxygens.

In another embodiment there is provided a method, the method comprising:
combining:
a) a fluorinated solvent;
b) a fluorinated sulfone;
c) at least one component selected from
i) a borate salt represented by Formula (IX):

$$LiBF_{(4-2p)}(C_2O_4)_p \quad (IX)$$

wherein p is 0, 1, or 2; and/or
ii) an oxalate salt represented by Formula (X):

$$LiPF_{(6-2q)}(C_2O_4)_q \quad (X)$$

wherein q is 1, 2, or 3; and/or
iii) a fluorinated cyclic carbonate; and
d) at least one electrolyte salt;
to form an electrolyte composition.

In another embodiment there is provided an electrochemical cell, the electrochemical cell comprising:
(a) a housing;
(b) an anode and a cathode disposed in the housing and in ionically conductive contact with one another;

(c) an electrolyte composition as disclosed herein disposed in the housing and providing an ionically conductive pathway between the anode and the cathode; and (d) a porous separator between the anode and the cathode.

In a further embodiment, the electrochemical cell is a lithium ion battery.

DETAILED DESCRIPTION

Figure 1:
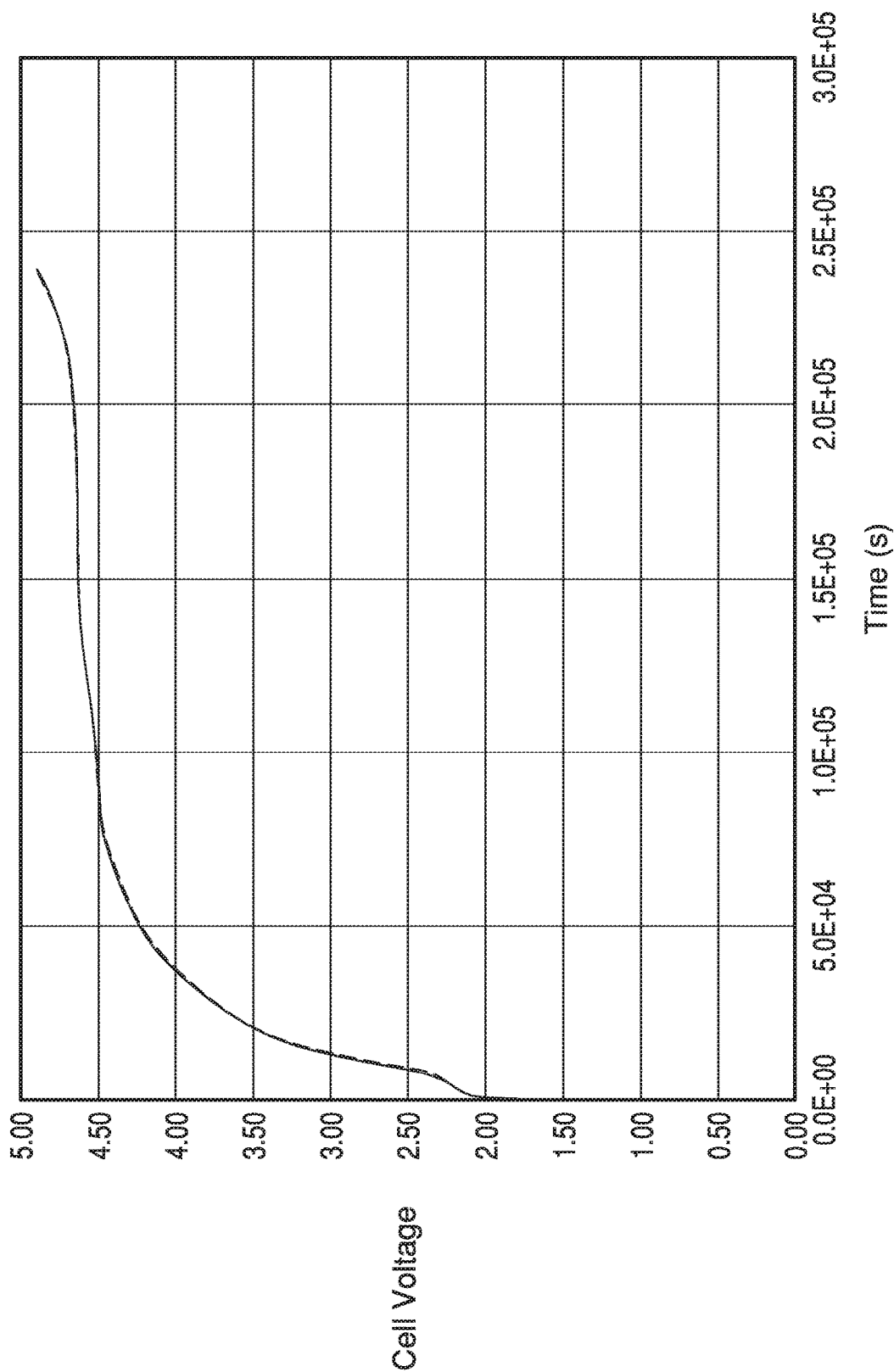
FIG. 1 shows the voltage profiles at 25° C. for the coin cells containing the electrolyte of Example 1.

As used above and throughout the disclosure, the following terms, unless otherwise indicated, shall be defined as follows: The term "electrolyte composition", as used herein, refers to a chemical composition suitable for use as an electrolyte in an electrochemical cell.

The term "electrolyte salt", as used herein, refers to an ionic salt that is at least partially soluble in the solvent of the electrolyte composition and that at least partially dissociates into ions in the solvent of the electrolyte composition to form a conductive electrolyte composition.

The term "anode", as used herein, refers to the electrode of an electrochemical cell, at which oxidation occurs. In a galvanic cell, such as a battery, the anode is the negatively charged electrode. In a secondary (i.e. rechargeable) battery, the anode is the electrode at which oxidation occurs during discharge and reduction occurs during charging.

The term "cathode", refers to the electrode of an electrochemical cell, at which reduction occurs. In a galvanic cell, such as a battery, the cathode is the positively charged electrode. In a secondary (i.e. rechargeable) battery, the cathode is the electrode at which reduction occurs during discharge and oxidation occurs during charging.

The term "lithium ion battery", as used herein, refers to a type of rechargeable battery in which lithium ions move from the anode to the cathode during discharge and from the cathode to the anode during charge.

Equilibrium potential between lithium and lithium ion is the potential of a reference electrode using lithium metal in contact with the non-aqueous electrolyte containing lithium salt at a concentration sufficient to give about 1 mole/liter of lithium ion concentration, and subjected to sufficiently small currents so that the potential of the reference electrode is not significantly altered from its equilibrium value (Li/Li$^+$). The potential of such a Li/Li$^+$ reference electrode is assigned here the value of 0.0V. Potential of an anode or cathode means the potential difference between the anode or cathode and that of a Li/Li$^+$ reference electrode. Herein voltage means the voltage difference between the cathode and the anode of a cell, neither electrode of which may be operating at a potential of 0.0V.

The term "alkyl group", as used herein, refers to a linear or branched chain hydrocarbon group containing no unsaturation.

The term "fluoroalkyl group", as used herein, refers to an alkyl group wherein at least one hydrogen is replaced by fluorine.

The term "alkylene group", as used herein, refers to a divalent group containing carbon and hydrogen, which may be linear or branched, and contains no unsaturation.

The term "fluoroalkylene group", as used herein, refers to an alkylene group wherein at least one hydrogen is replaced by fluorine.

The term "sulfone", as used herein, refers to a chemical compound containing a sulfonyl group —SO$_2$— bonded to two carbon atoms, the sulfone having a general formula R'—SO$_2$—R", wherein R' and R" may be the same or different and are each independently alkyl groups containing at least one carbon atom, and can each be substituted or unsubstituted, saturated or unsaturated.

The term "fluorinated sulfone", as used herein, refers to a sulfone wherein at least one hydrogen is replaced by fluorine in either or both of R' and R".

The term "ether oxygen", as used herein, refers to an oxygen atom bonded to two carbon atoms.

Disclosed herein are electrolyte compositions comprising a fluorinated solvent; a fluorinated sulfone; at least one component selected from a borate salt as defined herein, and/or an oxalate salt as defined herein, and/or a fluorinated cyclic carbonate; and at least one electrolyte salt. The fluorinated solvent may be a fluorinated acyclic carboxylic acid ester, a fluorinated acyclic carbonate, a fluorinated acyclic ether, or combinations thereof. The electrolyte compositions are useful in electrochemical cells, particularly lithium ion batteries.

Suitable fluorinated acyclic carboxylic acid esters are represented by Formula (I)

$$R^1\text{—COO—}R^2 \qquad (i)$$

wherein
i) R$^1$ is H, an alkyl group, or a fluoroalkyl group;
ii) R$^2$ is an alkyl group or a fluoroalkyl group;
iii) either or both of R$^1$ and R$^2$ comprises fluorine; and
iv) R$^1$ and R$^2$, taken as a pair, comprise at least two carbon atoms but not more than seven carbon atoms.

In one embodiment, R$^1$ is H and R$^2$ is a fluoroalkyl group. In one embodiment, R$^1$ is an alkyl group and R$^2$ is a fluoroalkyl group. In one embodiment, R$^1$ is a fluoroalkyl group and R$^2$ is an alkyl group. In one embodiment, R$^1$ is a fluoroalkyl group and R$^2$ is a fluoroalkyl group, and R$^1$ and R$^2$ can be either the same as or different from each other. In one embodiment, R$^1$ comprises one carbon atom. In one embodiment, R$^1$ comprises two carbon atoms.

In another embodiment, R$^1$ and R$^2$ are as defined herein above, and R$^1$ and R$^2$, taken as a pair, comprise at least two carbon atoms but not more than seven carbon atoms and further comprise at least two fluorine atoms, with the proviso that neither R$^1$ nor R$^2$ contains a FCH$_2$— group or a —FCH— group.

Examples of suitable fluorinated acyclic carboxylic acid esters include without limitation CH$_3$—COO—CH$_2$CF$_2$H (2,2-difluoroethyl acetate, CAS No. 1550-44-3), CH$_3$—COO—CH$_2$CF$_3$ (2,2,2-trifluoroethyl acetate, CAS No. 406-95-1), CH$_3$CH$_2$—COO—CH$_2$CF$_2$H (2,2-difluoroethyl propionate, CAS No. 1133129-90-4), CH$_3$—COO—CH$_2$CH$_2$CF$_2$H (3,3-difluoropropyl acetate), CH$_3$CH$_2$—COO—CH$_2$CH$_2$CF$_2$H (3,3-difluoropropyl propionate), HCF$_2$—CH$_2$—CH$_2$—COO—CH$_2$CH$_3$ (ethyl 4,4-difluorobutanoate, CAS No. 1240725-43-2), H—COO—CH$_2$CF$_2$H (difluoroethyl formate, CAS No. 1137875-58-1), H—COO—CH$_2$CF$_3$ (trifluoroethyl formate, CAS No.

32042-38-9), and mixtures thereof. In one embodiment, the fluorinated acyclic carboxylic acid ester comprises CH₃—COO—CH₂CF₂H, CH₃CH₂—COO—CH₂CF₂H, F₂CHCH₂—COO—CH₃, F₂CHCH₂—COO—CH₂CH₃, CH₃—COO—CH₂CH₂CF₂H, CH₃CH₂—COO—CH₂CH₂CF₂H, F₂CHCH₂CH₂—COO—CH₂CH₃, CH₃—COO—CH₂CF₃, CH₃CH₂—COO—CH₂CF₂H, CH₃—COO—CH₂CF₃, H—COO—CH₂CF₂H, H—COO—CH₂CF₃, or mixtures thereof. In one embodiment, the fluorinated acyclic carboxylic acid ester comprises 2,2-difluoroethyl acetate (CH₃—COO—CH₂CF₂H). In one embodiment, the fluorinated acyclic carboxylic acid ester comprises 2,2-difluoroethyl propionate (CH₃CH₂—COO—CH₂CF₂H). In one embodiment, the fluorinated acyclic carboxylic acid ester comprises 2,2,2-trifluoroethyl acetate (CH₃—COO—CH₂CF₃). In one embodiment, the fluorinated acyclic carboxylic acid ester comprises 2,2-difluoroethyl formate (H—COO—CH₂CF₂H).

Suitable fluorinated acyclic carbonates are represented by Formula (II)

wherein
i) $R^3$ is a fluoroalkyl group;
ii) $R^4$ is an alkyl group or a fluoroalkyl group; and
iii) $R^3$ and $R^4$ taken as a pair comprise at least two carbon atoms but not more than seven carbon atoms.

In one embodiment, $R^3$ is a fluoroalkyl group and $R^4$ is an alkyl group. In one embodiment, $R^3$ is a fluoroalkyl group and $R^4$ is a fluoroalkyl group, and $R^3$ and $R^4$ can be either the same as or different from each other. In one embodiment, $R^3$ comprises one carbon atom. In one embodiment, $R^3$ comprises two carbon atoms.

In another embodiment, $R^3$ and $R^4$ are as defined herein above, and $R^3$ and $R^4$, taken as a pair, comprise at least two carbon atoms but not more than seven carbon atoms and further comprise at least two fluorine atoms, with the proviso that neither $R^3$ nor $R^4$ contains a FCH₂— group or a —FCH— group.

Examples of suitable fluorinated acyclic carbonates include without limitation CH₃—OC(O)O—CH₂CF₂H (methyl 2,2-difluoroethyl carbonate, CAS No. 916678-13-2), CH₃—OC(O)O—CH₂CF₃ (methyl 2,2,2-trifluoroethyl carbonate, CAS No. 156783-95-8), CH₃—OC(O)O—CH₂CF₂CF₂H (methyl 2,2,3,3-tetrafluoropropyl carbonate, CAS No. 156783-98-1), HCF₂CH₂—OCOO—CH₂CH₃ (2,2-difluoroethyl ethyl carbonate, CAS No. 916678-14-3), and CF₃CH₂—OCOO—CH₂CH₃ (2,2,2-trifluoroethyl ethyl carbonate, CAS No. 156783-96-9).

Suitable fluorinated acyclic ethers are represented by Formula (III)

wherein
i) $R^5$ is a fluoroalkyl group;
ii) $R^6$ is an alkyl group or a fluoroalkyl group; and
iii) $R^5$ and $R^6$ taken as a pair comprise at least two carbon atoms but not more than seven carbon atoms.

In one embodiment, $R^5$ is a fluoroalkyl group and $R^6$ is an alkyl group. In one embodiment, $R^5$ is a fluoroalkyl group and $R^6$ is a fluoroalkyl group, and $R^5$ and $R^6$ can be either the same as or different from each other. In one embodiment, $R^5$ comprises one carbon atom. In one embodiment, $R^5$ comprises two carbon atoms.

In another embodiment, $R^5$ and $R^6$ are as defined herein above, and $R^5$ and $R^6$, taken as a pair, comprise at least two carbon atoms but not more than seven carbon atoms and further comprise at least two fluorine atoms, with the proviso that neither $R^5$ nor $R^6$ contains a FCH₂— group or a —FCH— group.

Examples of suitable fluorinated acyclic ethers include without limitation HCF₂CF₂CH₂—O—CF₂CF₂H (CAS No. 16627-68-2) and HCF₂CH₂—O—CF₂CF₂H (CAS No. 50807-77-7).

The fluorinated solvent may comprise a fluorinated acyclic carboxylic acid ester, a fluorinated acyclic carbonate, a fluorinated acyclic ether, or mixtures thereof. As used herein, the term "mixtures thereof" encompasses both mixtures within and mixtures between solvent classes, for example mixtures of two or more fluorinated acyclic carboxylic acid esters, and also mixtures of fluorinated acyclic carboxylic acid esters and fluorinated acyclic carbonates, for example. Non-limiting examples include a mixture of 2,2-difluoroethyl acetate and 2,2-difluoroethyl propionate; and a mixture of 2,2-difluoroethyl acetate and 2,2 difluoroethyl methyl carbonate.

In one embodiment, the fluorinated solvent is:
a) a fluorinated acyclic carboxylic acid ester represented by Formula (I):

b) a fluorinated acyclic carbonate represented by Formula (II):

c) a fluorinated acyclic ether represented by Formula (III):

or mixtures thereof;
wherein
i) $R^1$ is H, an alkyl group, or a fluoroalkyl group;
ii) $R^3$ and $R^5$ is each independently a fluoroalkyl group and can be either the same as or different from each other;
iii) $R^2$, $R^4$, and $R^6$ is each independently an alkyl group or a fluoroalkyl group and can be either the same as or different from each other;
iv) either or both of $R^1$ and $R^2$ comprises fluorine; and
v) $R^1$ and $R^2$, $R^3$ and $R^4$, and $R^5$ and $R^6$, each taken as a pair, comprise at least two carbon atoms but not more than seven carbon atoms.

In another embodiment, the fluorinated solvent is
a) a fluorinated acyclic carboxylic acid ester represented by Formula (I):

b) a fluorinated acyclic carbonate represented by Formula (II):

c) a fluorinated acyclic ether represented by Formula (III):

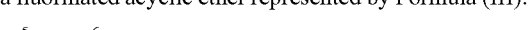

or mixtures thereof;
wherein
i) $R^1$ is H, an alkyl group, or a fluoroalkyl group;
ii) $R^3$ and $R^5$ is each independently a fluoroalkyl group and can be either the same as or different from each other;
iii) $R^2$, $R^4$, and $R^6$ is each independently an alkyl group or a fluoroalkyl group and can be either the same as or different from each other;
iv) either or both of $R^1$ and $R^2$ comprises fluorine; and
v) $R^1$ and $R^2$, $R^3$ and $R^4$, and $R^5$ and $R^6$, each taken as a pair, comprise at least two carbon atoms but not more than seven carbon atoms and further comprise at least two fluorine atoms, with the proviso that none of $R^1$, $R^2$, $R^3$, $R^4$, $R^5$, nor $R^6$ contains a $FCH_2$— group or a —FCH— group.

In the electrolyte compositions disclosed herein, the fluorinated solvent or mixtures thereof can be used in various amounts depending on the desired properties of the electrolyte composition. In one embodiment, the fluorinated solvent comprises about 5% to about 95% by weight of the electrolyte composition. In another embodiment, the fluorinated solvent comprises about 10% to about 90% by weight of the electrolyte composition. In another embodiment, the fluorinated solvent comprises about 10% to about 80% by weight of the electrolyte composition. In another embodiment, the fluorinated solvent comprises about 30% to about 70% by weight of the electrolyte composition. In another embodiment, the fluorinated solvent comprises about 50% to about 70% by weight of the electrolyte composition. In another embodiment, the fluorinated solvent comprises about 45% to about 65% by weight of the electrolyte composition. In another embodiment, the fluorinated solvent comprises about 6% to about 30% by weight of the electrolyte composition. In another embodiment, the fluorinated solvent comprises about 60% to about 65% by weight of the electrolyte composition. In another embodiment, the fluorinated solvent comprises about 20% to about 45% by weight of the electrolyte composition.

Fluorinated acyclic carboxylic acid esters, fluorinated acyclic carbonates, and fluorinated acyclic ethers suitable for use herein may be prepared using known methods. For example, acetyl chloride may be reacted with 2,2-difluoroethanol (with or without a basic catalyst) to form 2,2-difluoroethyl acetate. Additionally, 2,2-difluoroethyl acetate and 2,2-difluoroethyl propionate may be prepared using the method described by Wiesenhofer et al. (WO 2009/040367 A1, Example 5). Alternatively, 2,2-difluoroethyl acetate can be prepared using the method described in the Examples herein below. Other fluorinated acyclic carboxylic acid esters may be prepared using the same method using different starting carboxylate salts. Similarly, methyl chloroformate may be reacted with 2,2-difluoroethanol to form methyl 2,2-difluoroethyl carbonate. Synthesis of $HCF_2CF_2CH_2$—O—$CF_2CF_2H$ can be done by reacting 2,2,3,3-tetrafluoropropanol with tetrafluoroethylene in the presence of base (e.g., NaH, etc.). Similarly, reaction of 2,2-difluoroethanol with tetrafluoroethylene yields $HCF_2CH_2$—O—$CF_2CF_2H$. Alternatively, some of the fluorinated solvents disclosed herein may be obtained commercially from companies such as Matrix Scientific (Columbia S.C.). For best results, it is desirable to purify the fluorinated acyclic carboxylic esters and fluorinated acyclic carbonates to a purity level of at least about 99.9%, more particularly at least about 99.99%. The fluorinated solvents disclosed herein may be purified using distillation methods such as vacuum distillation or spinning band distillation.

The electrolyte compositions disclosed herein comprise a fluorinated sulfone. In one embodiment, suitable fluorinated sulfones are represented by Formula (IV):

$$R^7\text{—}SO_2\text{—}R^8 \qquad (IV)$$

wherein $R^7$ is a $C_1$ to $C_{10}$ fluoroalkyl group, optionally comprising one or more ether oxygens, and $R^8$ is a $C_1$ to $C_{10}$ alkyl group or a $C_1$ to $C_{10}$ fluoroalkyl group, each optionally comprising one or more ether oxygens. In one embodiment, $R^7$ comprises one or more ether oxygens. In one embodiment, $R^7$ comprises one ether oxygen. In one embodiment, $R^8$ is a $C_1$ to $C_{10}$ alkyl group. In one embodiment, $R^8$ is a $C_1$ to $C_{10}$ alkyl group and comprises one or more ether oxygens.

In one embodiment, $R^8$ is a $C_1$ to $C_{10}$ alkyl group and comprises one ether oxygen. In one embodiment, $R^8$ is a $C_1$ to $C_{10}$ fluoroalkyl group. In one embodiment, $R^8$ is a $C_1$ to $C_{10}$ fluoroalkyl group and comprises one or more ether oxygens. In one embodiment, $R^8$ is a $C_1$ to $C_{10}$ fluoroalkyl group and comprises one ether oxygen. In one embodiment, $R^7$ comprises one carbon atom. In one embodiment, $R^8$ comprises one carbon atom. In one embodiment, $R^7$ comprises two carbon atoms. In one embodiment, $R^8$ comprises two carbon atoms.

In one embodiment, suitable fluorinated sulfones are represented by Formula (V):

$$CF_2H\text{—}R^9\text{—}SO_2\text{—}R^{10} \qquad (V)$$

wherein $R^9$ is optionally absent, or a $C_1$ to $C_{10}$ alkylene group, or a $C_1$ to $C_{10}$ fluoroalkylene group, each group optionally comprising one or more ether oxygens; and $R^{10}$ is a $C_1$ to $C_{10}$ alkyl group or a $C_1$ to $C_{10}$ fluoroalkyl group, each optionally comprising one or more ether oxygens.

In one embodiment, $R^9$ is absent. In one embodiment, $R^9$ is a $C_1$ to $C_{10}$ alkylene group. In one embodiment, $R^9$ is a $C_1$ to $C_{10}$ alkylene group comprising one or more ether oxygens. In one embodiment, $R^9$ is a $C_1$ to $C_{10}$ alkylene group comprising one ether oxygen. In one embodiment, $R^9$ is a $C_1$ to $C_{10}$ fluoroalkylene group. In one embodiment, $R^9$ is a $C_1$ to $C_{10}$ fluoroalkylene group comprising one or more ether oxygens. In one embodiment, $R^9$ is a $C_1$ to $C_{10}$ fluoroalkylene group comprising one ether oxygen. In one embodiment, $R^9$ comprises one carbon atom. In one embodiment, $R^9$ comprises two carbon atoms.

In one embodiment, $R^1$ is a $C_1$ to $C_{10}$ alkyl group. In one embodiment, $R^{10}$ is a $C_1$ to $C_{10}$ alkyl group comprising one or more ether oxygens. In one embodiment, $R^{10}$ is a $C_1$ to $C_{10}$ alkyl group comprising one ether oxygen. In one embodiment, $R^{10}$ is a $C_1$ to $C_{10}$ fluoroalkyl group. In one embodiment, $R^{10}$ is a $C_1$ to $C_{10}$ fluoroalkyl group comprising one or more ether oxygens. In one embodiment, $R^{10}$ is a $C_1$ to $C_{10}$ fluoroalkyl group comprising one ether oxygen. In one embodiment, $R_{10}$ comprises one carbon atom. In one embodiment, $R^{10}$ comprises two carbon atoms.

Examples of suitable fluorinated sulfones include without limitation difluoromethyl methyl sulfone ($CHF_2SO_2CH_3$); difluoromethyl ethyl sulfone ($CHF_2SO_2CH_2CH_3$); 2,2-difluoroethyl methyl sulfone ($CHF_2CH_2SO_2CH_3$); 2,2-difluoroethyl ethyl sulfone ($CHF_2CH_2SO_2CH_2CH_3$); 2,2-difluoroethyl isopropyl sulfone [$CHF_2CH_2SO_2CH(CH_3)_2$]; bis(2,2-difluoroethyl) sulfone [$(CHF_2CH_2)_2SO_2$]; fluoromethyl methyl sulfone ($CH_2FSO_2CH_3$); fluoromethyl ethyl sulfone ($CH_2FSO_2CH_2CH_3$); 2-fluoroethyl methyl sulfone ($CH_2FCH_2SO_2CH_3$); 2-fluoroethyl ethyl sulfone ($CH_2FCH_2SO_2CH_2CH_3$); 2-fluoroethyl isopropyl sulfone [$CH_2FCH_2SO_2CH(CH_3)_2$]; bis(2-fluoroethyl) sulfone [$(CH_2FCH_2)_2SO_2$]; 1,1,2,2-tetrafluoroethyl methyl sulfone ($CHF_2CF_2SO_2CH_3$); trifluoromethyl methyl sulfone ($CF_3SO_2CH_3$); trifluoromethyl ethyl sulfone ($CF_3SO_2CH_2CH_3$); 2,2,2-trifluoroethyl methyl sulfone ($CF_3CH_2SO_2CH_3$); 2,2,2-trifluoroethyl ethyl sulfone ($CF_3CH_2SO_2CH_2CH_3$); 2,2,2-trifluoroethyl isopropyl sulfone [$CF_3CH_2SO_2CH(CH_3)_2$]; bis(2,2,2-trifluoroethyl) sulfone [$(CF_3CH_2)_2SO_2$]; or mixtures thereof. In one embodiment, the fluorinated sulfone comprises $CHF_2SO_2CH_3$, $CHF_2SO_2CH_2CH_3$, $CHF_2CH_2SO_2CH_3$, $CHF_2CH_2SO_2CH_2CH_3$, $CHF_2CH_2SO_2CH(CH_3)_2$, $(CHF_2CH_2)_2SO_2$, $CH_2FSO_2CH_3$, $CH_2FSO_2CH_2CH_3$, $CH_2FCH_2SO_2CH_3$, $CH_2FCH_2SO_2CH_2CH_3$, $CH_2FCH_2SO_2CH(CH_3)_2$, $(CH_2FCH_2)_2SO_2$, $CHF_2CF_2SO_2CH_3$, $CF_3SO_2CH_3$, $CF_3SO_2CH_2CH_3$, $CF_3CH_2SO_2CH_3$, $CF_3CH_2SO_2CH_2CH_3$, $CF_3CH_2SO_2CH(CH_3)_2$, $(CF_3CH_2)_2SO_2$, or mixtures thereof.

In one embodiment, the fluorinated sulfone comprises difluoromethyl methyl sulfone. In one embodiment, the fluorinated sulfone comprises difluoromethyl ethyl sulfone. In one embodiment, the fluorinated sulfone comprises fluoromethyl methyl sulfone.

In some embodiments, the electrolyte composition further comprises a non-fluorinated sulfone. In one embodiment, the electrolyte composition further comprises dimethyl sulfone. In one embodiment, the electrolyte composition further comprises diethyl sulfone. In one embodiment, the electrolyte composition further comprises methyl ethyl sulfone.

In the electrolyte compositions disclosed herein, the fluorinated sulfone can be used in various amounts depending on the desired properties of the electrolyte composition. In some embodiments, the fluorinated sulfone is present in the electrolyte composition in the range of from about 0.1% to about 70% by weight of the electrolyte composition, or about 1% to about 65% by weight, or about 1% to about 60% by weight, or about 1% to about 50% by weight, or about 1% to about 40% by weight, or about 1% to about 35% by weight, or about 1% to about 30% by weight, or about 25% by weight, or about 1% to about 20% by weight, or about 1% to about 10% by weight, or about 1% to about 5% by weight, or about 5% to about 50% by weight of the electrolyte composition, based on the total weight of the electrolyte composition.

Fluorinated sulfones suitable for use herein may be prepared using known methods. Fluorinated sulfones of Formula (IV)

$$R^7\text{—}SO_2\text{—}R^8 \quad (IV)$$

may be prepared, for example, as disclosed in: a) Robins, M. J.; Wnuk, S. F.; *J. Org. Chem.* 1993, 58, 3800-3801; b) McCarthy, J. R. et al. *J. Am. Chem. Soc.* 1985, 107, 735-737; and c) Hendrickson, J. B.; Bair, K. W. *J. Org. Chem.* 1977, 42, 3875-3878.

Fluorinated sulfones of Formula (V)

$$CF_2H\text{—}R^9\text{—}SO_2\text{—}R^{10} \quad (V)$$

may be prepared by reacting a sulfur-containing reactant represented by Formula (VI) or (VII):

$$R^{11}SM \quad (VI)$$

or $$M_2S \quad (VII)$$

wherein $R^{11}$ is a $C_1$ to $C_{10}$ alkyl group, optionally substituted with one or more ether oxygens, or fluoroalkyl group, optionally substituted with one or more ether oxygens, S is sulfur, and M is a cation selected from the group consisting of $Na^+$, $K^+$, $Cs^+$, and a tetraalkylammonium cation, such as $R_4N^+$, where R is $CH_3$, $C_2H_5$, or $C_4H_9$, with a fluorinated alkyl compound represented by Formula (VIII):

$$CF_2H\text{—}R^{12}\text{—}X \quad (VIII)$$

wherein $R^{12}$ is either absent or a $C_1$ to $C_{10}$ alkylene group, optionally substituted with one or more ether oxygens, or fluoroalkylene group, optionally substituted with one or more ether oxygens, the carbon atom adjacent to X in $R^{12}$ is not fluorinated, and X is a leaving group selected from the group consisting of Br, Cl, I, and $\text{—}OSO_2R^{13}$ where $R^{13}$ is aryl, F, $CF_3$, $C_4F_9$, or $C_1$ to $C_{10}$ alkyl to give a fluorinated sulfide product. The fluorinated sulfide can be oxidized to make the fluorinated sulfone $CF_2H\text{—}R^9\text{—}SO_2\text{—}R^{10}$.

Suitable sulfur-containing reactants include without limitation, sodium thiomethoxide, potassium thiomethoxide, cesium thiomethoxide, tetramethyl ammonium thiomethoxide, tetraethyl ammonium thiomethoxide, tetrabutyl ammonium thiomethoxide, sodium thioethoxide, potassium thioethoxide, cesium thioethoxide, tetrabutyl ammonium thioethoxide, sodium 2-propanethiolate, potassium 2-propanethiolate, cesium 2-propanethiolate, tetrabutyl ammonium 2-propanethiolate, sodium sulfide, potassium sulfide, cesium sulfide, tetramethyl ammonium sulfide, tetraethyl ammonium sulfide, and tetrabutyl ammonium sulfide. Many of these sulfur-containing reactants are commercially available from companies such as Aldrich (Milwaukee, Wis.). Alternatively, the sulfur-containing reactant can be generated in situ by adding a base such as sodium hydroxide or potassium hydroxide to a thiol represented by the formula $R^{11}SH$ to produce the corresponding thiolate salt $R^{11}SM$, wherein $R^1$ is defined as above.

In some embodiments, the fluorinated alkyl compound is a fluorinated alkyl halide represented by the formula: $CHF_2\text{—}R^{12}\text{—}X$, wherein $R^{12}$ is defined as above, and X is Cl, Br or I. In one embodiment, X is Cl or Br. Examples of useful fluorinated alkyl halides include without limitation $CHF_2Cl$, $CHF_2Br$, $CHF_2\text{—}CH_2\text{-Br}$, $CHF_2\text{—}CH_2\text{—}Cl$, $CHF_2\text{—}CH_2CH_2\text{-Br}$, $CHF_2\text{—}CH_2CH_2\text{—}Cl$, $CHF_2\text{—}CH_2CH_2CH_2\text{-Br}$, and $CHF_2\text{—}CH_2CH_2CH_2\text{—}Cl$. The fluorinated alkyl halides can be prepared using liquid phase or gas phase methods known in the art, for example using the methods described by Chen et al. (U.S. Patent Application Publication No. 2002/0183569), Bolmer et al. (U.S. Pat. No. 6,063,969), or Boyce et al. (U.S. Pat. No. 5,910,616).

The sulfur-containing reactant and the fluorinated alkyl compound are contacted for a time sufficient to form a fluorinated sulfide product. The reactants can be contacted in the absence of a solvent, in a reaction medium comprising a solvent, or in the gas phase.

In one embodiment, the sulfur-containing reactant and the fluorinated alkyl compound are contacted in a reaction medium comprising a solvent. During the reaction, the temperature of the reaction medium is about 20° C. to about 300° C., more particularly about 20° C. to about 200° C., more particularly about 20° C. to about 150° C., more particularly about 20° C. to about 80° C., and more particularly, 20° C. to about 60° C. The reaction medium can be agitated during the reaction using conventional means such as a magnetic stirrer, an overhead mixer, and the like. In various embodiments, the reaction pressure can be maintained at a level at which the solvent and reactants are kept in the liquid phase. A pressure between atmospheric and 1,000 psig is suitable for such purpose. Typically, the time sufficient to form a fluorinated sulfide product is about 5 hours to about 200 hours, more particularly about 5 hours to about 100 hours, and more particularly about 5 hours to about 50 hours. The reaction may occur in a batch or in a continuously fed reactor in which one or both reactants and optionally solvent are fed on a continuous basis. Product may accumulate in the reactor or be removed on a continuous basis.

Suitable solvents for use in preparing the fluorinated sulfide include without limitation, dimethylsulfoxide, toluene, tetrahydrofuran, ether, dimethylformamide, dimethylacetamide, acetonitrile, hexamethylphosphoramide, dichloromethane, 1,2-dimethoxyethane, N-methylpyrrolidinone, water, alcohols, ether-hexane mixtures, and tetrahydrofuran-hexanes mixtures. The fluorinated sulfide product formed in the reaction can also serve as the solvent. Therefore, the use of an additional solvent is optional. In one embodiment, the solvent is water. In another embodiment, the solvent is dimethylformamide. In another embodiment, the solvent is a 1:1 volume mixture of hexanes and tetrahydrofuran.

The fluorinated sulfide is then oxidized to form a fluorinated sulfone product in a reaction medium comprising a solvent. The oxidization can be carried out in any suitable solvent, which is inert to oxidizing agents. Suitable solvents include without limitation, methanol, dichloromethane, chloroform, benzene, toluene, chlorobenzene, and water. Suitable oxidizing agents include without limitation, m-chloroperoxybenzoic acid, peroxyphthalic acid, hydrogen peroxide (optionally in the presence of catalyst, such as $TaCl_5$, methyltrioxorhenium ($CH_3R_eO_3$), tungstic acid, or ortho-vanadates, etc.), hydrogen peroxide/acetic acid mixture, potassium monopersulfate, sodium periodate, t-butyl hypochlorite, sodium hypochlorite or sodium hypobromite, or any other oxidizing agents typically used for conversion of sulfides into sulfones and sulfoxides (for additional examples of oxidizing agents, see M. Hudlicky, Oxidations in Organic Chemistry, ACS Monograph 186, Washington D.C., 1990, p. 252-262.

The fluorinated sulfide is reacted with the oxidizing agent for a time sufficient to form the fluorinated sulfone product. During the reaction, the temperature of the reaction medium is about 0° C. to about 200° C., more particularly about 0° C. to about 150° C., more particularly about 0° C. to about 80° C., and more particularly, about 0° C. to about 60° C.

The reaction medium can be agitated during the reaction using conventional means such as a magnetic stirrer, an overhead mixer, and the like. In various embodiments, the reaction pressure can be maintained at a level at which the solvent and reactants are kept in the liquid phase. A pressure between atmospheric and 1,000 psig is suitable for such purpose. Typically, the time sufficient to form the fluorinated sulfone product is about 1 hours to about 100 hours, more particularly about 1 hour to about 75 hours, and more particularly about 3 hours to about 48 hours. The oxidation reaction may occur in a batch or in a continuously fed reactor in which one or both reactants and optionally solvent are fed on a continuous basis. Product may accumulate in the reactor or be removed on a continuous basis.

The fluorinated sulfone product formed in the reaction may be recovered from the reaction medium and purified using methods known in the art, for example, solvent extraction, column chromatography, recrystallization, sublimation, or distillation methods such as vacuum distillation or spinning band distillation. For best results when used as an electrolyte solvent in a lithium ion battery, as discussed below, it is desirable to purify the fluorinated sulfone to a purity level of at least about 99.9%, more particularly at least about 99.99%.

The electrolyte compositions disclosed herein may further comprise at least one non-fluorinated cyclic or acyclic carbonate. Suitable non-fluorinated cyclic or acyclic carbonates include ethylene carbonate, ethyl methyl carbonate, dimethyl carbonate, diethyl carbonate, propylene carbonate, vinylene carbonate, di-tert-butyl carbonate, dipropyl carbonate, methyl propyl carbonate, ethyl propyl vinylene carbonate, methyl butyl carbonate, ethyl butyl carbonate, propyl butyl carbonate, dibutyl carbonate, vinylethylene carbonate, dimethylvinylene carbonate, or mixtures thereof. In one embodiment, the electrolyte composition further comprises at least one non-fluorinated cyclic carbonate. In one embodiment, the electrolyte composition further comprises at least one non-fluorinated acyclic carbonate. In some embodiments, the electrolyte composition further comprises ethylene carbonate. In some embodiments, the electrolyte composition further comprises propylene carbonate. In some embodiments, the electrolyte composition further comprises dimethyl carbonate. In some embodiments, the electrolyte composition further comprises ethyl methyl carbonate. It is desirable to use a carbonate that is battery grade or has a purity level of at least about 99.9%, for example at least about 99.99%. Non-fluorinated cyclic or acyclic carbonates are available commercially or may be prepared by methods known in the art.

In the electrolyte compositions disclosed herein, the non-fluorinated cyclic or acyclic carbonate can be used in various amounts depending on the desired properties of the electrolyte composition. In one embodiment, the non-fluorinated carbonate(s) in combination is present in the electrolyte composition in the range of from about 0.5 percent to about 75 percent by weight of the electrolyte composition, for example about 5 percent to about 65 percent by weight, or about 5 percent to about 50 percent by weight, or about 10 percent to about 40 percent by weight of the electrolyte composition, based on the total weight of the electrolyte composition.

In some embodiments, the electrolyte composition further comprises a non-fluorinated sulfone and/or at least one non-fluorinated cyclic or acyclic carbonate.

The electrolyte compositions disclosed herein also comprise at least one component selected from
i) a borate salt represented by Formula (IX):

$$LiBF_{(4-2p)}(C_2O_4)_p \qquad (IX)$$

wherein p is 0, 1, or 2; and/or
ii) an oxalate salt represented by Formula (X):

$$LiPF_{(6-2q)}(C_2O_4)_q \qquad (X)$$

wherein q is 1, 2, or 3; and/or
iii) a fluorinated cyclic carbonate.

In one embodiment, the component is a borate salt of Formula (IX). In one embodiment, the component is an oxalate salt of Formula (X). In one embodiment, the component is a fluorinated cyclic carbonate. In one embodiment, the component is a borate salt of Formula (IX) and an oxalate salt of Formula (X). In one embodiment, the component is a borate salt of Formula (IX) and a fluorinated cyclic carbonate. In one embodiment, the component is an oxalate salt of Formula (X) and a fluorinated cyclic carbonate. In one embodiment, the component is a borate salt of Formula (IX), an oxalate salt of Formula (X), and a fluorinated cyclic carbonate.

The borate salt disclosed herein may be lithium tetrafluoroborate ($LiBF_4$), lithium difluoro(oxalato)borate [$LiBF_2(C_2O_4)$], lithium bis(oxalato)borate [$LiB(C_2O_4)_2$], or mixtures thereof. In one embodiment, the borate salt comprises lithium tetrafluoroborate. In one embodiment, the borate salt comprises lithium difluoro(oxalato)borate. In one embodiment, the borate salt comprises lithium bis(oxalato)borate. Mixtures of two or more of these may also be used. The borate salts disclosed herein may be obtained commercially or prepared using methods known in the art.

In one embodiment, the electrolyte composition comprises about 0.001 weight percent to about 15 weight percent of a borate salt of Formula (IX), based on the total weight of the electrolyte composition. In other embodiments, the electrolyte composition may comprise about 0.01 weight percent to about 15 weight percent, or about 0.1 weight percent to about 15 weight percent, or about 1 weight percent to about 15 weight percent, or about 1 weight percent to about 10 weight percent, or about 1 weight percent to about 5 weight percent, or about 0.5 weight percent to about 3 weight percent, of the borate salt, based on the total weight of the electrolyte composition.

The oxalate salt disclosed herein may be lithium tetrafluoro(oxalato)phosphate [LiPF$_4$(C$_2$O$_4$)], lithium difluorobis(oxalato)phosphate [LiPF$_2$(C$_2$O$_4$)$_2$], lithium tris(oxalato)phosphate [LiP(C$_2$O$_4$)$_3$], or mixtures thereof. In one embodiment, the oxalate salt comprises lithium tetrafluoro(oxalato)phosphate. In one embodiment, the oxalate salt comprises lithium difluorobis(oxalato)phosphate. In one embodiment, the oxalate salt comprises lithium tris(oxalato)phosphate. Mixtures of two or more of these may also be used. The oxalate salts disclosed herein may be prepared using methods known in the art, see for example Chem. Eur. J., 2004, 10, 2451. Lithium tris(oxalato)phosphate, for example, can be prepared by a process wherein oxalic acid or its derivative is reacted with an active phosphorous compound such as phosphorous pentachloride in a first step, followed by contact with lithium hydride in a second step. Suitable derivatives of oxalic acid include, for example, oxalyl chloride or oxalyl bromide.

In one embodiment, the electrolyte composition comprises about 0.001 weight percent to about 15 weight percent of an oxalate salt of Formula (X), based on the total weight of the electrolyte composition. In other embodiments, the electrolyte composition may comprise about 0.01 weight percent to about 15 weight percent, or about 0.1 weight percent to about 15 weight percent, or about 1 weight percent to about 15 weight percent, or about 1 weight percent to about 10 weight percent, or about 1 weight percent to about 5 weight percent, or about 0.5 weight percent to about 3 weight percent, of the oxalate salt, based on the total weight of the electrolyte composition.

In one embodiment, the electrolyte composition comprises about 0.001 weight percent to about 15 weight percent of the borate salt, the oxalate salt, or a combination thereof, based on the total weight of the electrolyte composition.

Suitable fluorinated cyclic carbonates can be represented by Formula (XI):

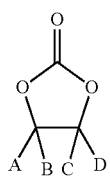

(XI)

wherein
  i) each of A, B, C, and D is H, F, a saturated or unsaturated C$_1$ to 5 C$_4$ alkyl group, a saturated or unsaturated C$_1$ to C$_4$ fluoroalkyl group and can be the same as or different from each other; and
  ii) at least one of A, B, C, and D comprises fluorine.
The term "unsaturated", as used herein, refers to an olefinically unsaturated group containing at least one carbon-carbon double bond.

Examples of suitable fluorinated cyclic carbonates include without limitation 4-fluoro-1,3-dioxolan-2-one (also referred to herein as fluoroethylene carbonate, abbreviated as FEC); 4,5-difluoro-1,3-dioxolan-2-one; 4,5-difluoro-4-methyl-1,3-dioxolan-2-one; 4,5-difluoro-4,5-dimethyl-1,3-dioxolan-2-one; 4,4-difluoro-1,3-dioxolan-2-one; 4,4,5-trifluoro-1,3-dioxolan-2-one, or mixtures thereof. In one embodiment, the fluorinated cyclic carbonate comprises fluoroethylene carbonate. The fluorinated cyclic carbonates disclosed herein may be obtained commercially or prepared using methods known in the art.

In one embodiment, the electrolyte composition comprises about 0.1 weight percent to about 60 weight percent of a fluorinated cyclic carbonate of Formula (XI), based on the total weight of the electrolyte composition. In other embodiments, the electrolyte composition may comprise about 0.5 weight percent to about 60 weight percent, or about 0.5 weight percent to about 55 weight percent, or about 0.5 weight percent to about 50 weight percent, or about 0.5 weight percent to about 45 weight percent, or about 0.5 weight percent to about 40 weight percent, or about 0.5 weight percent to about 35 weight percent, or about 0.5 weight percent to about 30 weight percent, or about 0.5 weight percent to about 25 weight percent, or about 0.5 weight percent to about 20 weight percent, or about 0.5 weight percent to about 15 weight percent, or about 0.5 weight percent to about 10 weight percent, or about 0.5 weight percent to about 5 weight percent, or about 0.5 weight percent to about 3 weight percent, of the fluorinated cyclic carbonate, based on the total weight of the electrolyte composition.

In one embodiment, the electrolyte composition comprises 2,2-difluoroethyl acetate, difluoromethyl methyl sulfone, and lithium bis(oxalato)borate. In another embodiment, the electrolyte composition comprises 2,2-difluoroethyl acetate, difluoromethyl methyl sulfone, and 4-fluoro-1,3-dioxolan-2-one. In one embodiment, the electrolyte composition comprises 2,2-difluoroethyl acetate, difluoromethyl methyl sulfone, lithium bis(oxalato)borate, and 4-fluoro-1,3-dioxolan-2-one. In another embodiment, the electrolyte composition comprises 2,2-difluoroethyl acetate, difluoromethyl methyl sulfone, dimethyl carbonate, and 4-fluoro-1,3-dioxolan-2-one. In yet another embodiment, the electrolyte composition comprises 2,2-difluoroethyl acetate, difluoromethyl methyl sulfone, ethylene carbonate, lithium bis(oxalato)borate, and 4-fluoro-1,3-dioxolan-2-one.

In some embodiments, the electrolyte composition comprises about 10% to about 90%, or about 20% to about 80%, of 2,2-difluoroethyl acetate, and about 1% to about 65%, or about 5% to about 50%, of difluoromethyl methyl sulfone by weight of the electrolyte composition. In some embodiments, the electrolyte composition further comprises about 0.01% to about 15%, or about 0.1% to about 15%, of lithium bis(oxalato)borate by weight of the electrolyte composition. Alternatively, in some embodiments, the electrolyte composition further comprises about 0.5% to about 60%, or about 1% to about 50%, 4-fluoro-1,3-dioxolan-2-one by weight of the electrolyte composition. In some embodiments, the electrolyte composition further comprises about 0% to about 50% of dimethyl carbonate or ethylene carbonate by weight of the electrolyte composition. In one embodiment, the electrolyte composition comprises about 10% to about 90% 2,2-difluoroethyl acetate, about 0.1% to about 50% difluoromethyl methyl sulfone, and about 0.001% to about 15% of a borate salt of Formula (IX) by weight of the electrolyte composition.

The electrolyte compositions disclosed herein also contain at least one electrolyte salt. Suitable electrolyte salts include without limitation
  lithium hexafluorophosphate (LiPF$_6$),
  lithium tris(pentafluoroethyl)trifluorophosphate (LiPF$_3$(C$_2$F$_5$)$_3$),
  lithium bis(trifluoromethanesulfonyl)imide,
  lithium bis(perfluoroethanesulfonyl)imide,
  lithium (fluorosulfonyl) (nonafluorobutanesulfonyl) imide, lithium bis(fluorosulfonyl)imide,
lithium tetrafluoroborate,
lithium perchlorate,
lithium hexafluoroarsenate,
lithium trifluoromethanesulfonate,
lithium tris(trifluoromethanesulfonyl)methide,
$Li_2B_{12}F_{12-x}H_x$ where x is equal to 0 to 8, and
mixtures of lithium fluoride and anion receptors such as $B(OC_6F_5)_3$.

Mixtures of two or more of these or comparable electrolyte salts may also be used. In one embodiment, the electrolyte salt comprises lithium hexafluorophosphate. The electrolyte salt can be present in the electrolyte composition in an amount from about 0.2 M to about 2.0 M, for example from about 0.3 M to about 1.7 M, or for example from about 0.3 M to about 1.5 M, or for example from about 0.5 M to about 1.2 M, or for example from about 0.5 M to about 1.7 M.

Electrolyte compositions disclosed herein can additionally or optionally comprise additives that are known to those of ordinary skill in the art to be useful in conventional electrolyte compositions, particularly for use in lithium ion batteries. For example, electrolyte compositions disclosed herein can also include gas-reduction additives which are useful for reducing the amount of gas generated during charging and discharging of lithium ion batteries. Gas-reduction additives can be used in any effective amount, but can be included to comprise from about 0.05 wt % to about 10 wt %, alternatively from about 0.05 wt % to about 5 wt % of the electrolyte composition, or alternatively from about 0.5 wt % to about 2 wt % of the electrolyte composition.

Suitable gas-reduction additives that are known conventionally are, for example: halobenzenes such as fluorobenzene, chlorobenzene, bromobenzene, iodobenzene, or haloalkylbenzenes; 1,3-propane sultone; succinic anhydride; ethynyl sulfonyl benzene; 2-sulfobenzoic acid cyclic anhydride; divinyl sulfone; triphenylphosphate (TPP); diphenyl monobutyl phosphate (DMP); γ-butyrolactone; 2,3-dichloro-1,4-naphthoquinone; 1,2-naphthoquinone; 2,3-dibromo-1,4-naphthoquinone; 3-bromo-l,2-naphthoquinone; 2-acetylfuran; 2-acetyl-5-methylfuran; 2-methyl imidazole 1-(phenylsulfonyl)pyrrole; 2,3-benzofuran; fluoro-cyclotriphosphazenes such as 2,4,6-trifluoro-2-phenoxy-4,6-dipropoxy-cyclotriphosphazene and 2,4,6-trifuoro-2-(3-(trifluoromethyl)phenoxy)-6-ethoxy-cyclotriphosphazene; benzotriazole; perfluoroethylene carbonate; anisole; diethylphosphonate; fluoroalkyl-substituted dioxolanes such as 2-trifluoromethyldioxolane and 2,2-bistrifluoromethyl-1,3-dioxolane; trimethylene borate; dihydro-3-hydroxy-4,5,5-trimethyl-2(3H)-furanone; dihydro-2-methoxy-5,5-dimethyl-3(2H)-furanone; dihydro-5,5-dimethyl-2,3-furandione; propene sultone; diglycolic acid anhydride; di-2-propynyl oxalate; 4-hydroxy-3-pentenoic acid γ-lactone; $CF_3COOCH_2C(CH_3)(CH_2OCOCF_3)_2$; $CF_3COOCH_2CF_2CF_2CF_2CH_2OCOCF_3$; α-methylene-γ-butyrolactone; 3-methyl-2(5H)-furanone; 5,6-dihydro-2-pyranone; diethylene glycol, diacetate; triethylene glycol dimethacrylate; triglycol diacetate; 1,2-ethanedisulfonic anhydride; 1,3-propanedisulfonic anhydride; 2,2,7,7-tetraoxide 1,2,7-oxadithiepane; 3-methyl-, 2,2,5,5-tetraoxide 1,2,5-oxadithiolane; hexamethoxycyclotriphosphazene; 4,5-dimethyl-4,5-difluoro-1,3-dioxolan-2-one; 2-ethoxy-2,4,4,6,6-pentafluoro-2,2,4,4,6,6-hexahydro-1,3,5,2,4,6-triazatriphosphorine; 2,2,4,4,6-pentafluoro-2,2,4,4,6,6-hexahydro-6-methoxy-1,3,5,2,4,6-triazatriphosphorine; 4,5-Difluoro-1,3-dioxolan-2-one; 1,4-bis(ethenylsulfonyl)-butane; bis(vinylsulfonyl)-methane; 1,3-bis(ethenylsulfonyl)-propane; 1,2-bis(ethenylsulfonyl)-ethane; ethylene carbonate; diethyl carbonate; dimethyl carbonate; ethyl methyl carbonate; and 1,1'-[oxybis(methylenesulfonyl)]bis-ethene.

Other suitable additives that can be used are HF scavengers, such as silanes, silazanes (Si—NH—Si), epoxides, amines, aziridines (containing two carbons), salts of carbonic acid such as lithium oxalate, $B_2O_5$, and ZnO.

In another embodiment, there is provided herein an electrochemical cell comprising a housing, an anode and a cathode disposed in the housing and in ionically conductive contact with one another, an electrolyte composition as described herein above disposed in the housing and providing an ionically conductive pathway between the anode and the cathode, and a porous or microporous separator between the anode and the cathode. In some embodiments, the electrochemical cell is a lithium ion battery.

The housing may be any suitable container to house the electrochemical cell components. Housing materials are well-known in the art and can include, for example, metal and polymeric housings. While the shape of the housings is not particularly important, suitable housings can be fabricated in the shape of a small or large cylinder, a prismatic case, or a pouch. The anode and the cathode may be comprised of any suitable conducting material depending on the type of electrochemical cell. Suitable examples of anode materials include without limitation lithium metal, lithium metal alloys, lithium titanate, aluminum, platinum, palladium, graphite, transition metal oxides, and lithiated tin oxide. Suitable examples of cathode materials include without limitation graphite, aluminum, platinum, palladium, electroactive transition metal oxides comprising lithium or sodium, indium tin oxide, and conducting polymers such as polypyrrole and polyvinylferrocene.

The porous separator serves to prevent short circuiting between the anode and the cathode. The porous separator typically consists of a single-ply or multi-ply sheet of a microporous polymer such as polyethylene, polypropylene, polyamide, polyimide, or a combination thereof. The pore size of the porous separator is sufficiently large to permit transport of ions to provide ionically conductive contact between the anode and the cathode, but small enough to prevent contact of the anode and cathode either directly or from particle penetration or from dendrites which can from on the anode and cathode. Examples of porous separators suitable for use herein are disclosed in U.S. Patent Application Publication No. 2012/0149852, now U.S. Pat. No. 8,518,525.

Many different types of materials are known that can function as the anode or the cathode. In some embodiments, the cathode can include, for example, cathode electroactive materials comprising lithium and transition metals, such as $LiCoO_2$, $LiNiO_2$, $LiMn_2O_4$, $LiCo_{0.2}Ni_{0.2}O_2$, $LiV_3O_8$, $LiNi_{0.5}Mn_{1.5}O_4$; $LiFePO_4$, $LiMnPO_4$, $LiCoPO_4$, and $LiVPO_4F$. In other embodiments, the cathode active materials can include, for example:

$Li_aCoG_bO_2$ (0.90≤a≤1.8, and 0.001≤b≤0.1);

$Li_aNi_bMn_cCo_dR_eO_{2-f}Z_f$ where 0.8≤a≤1.2, 0.1≤b≤0.9, 0.0≤c≤0.7, 0.05≤d≤0.4, 0≤e≤0.2, wherein the sum of b+c+d+e is about 1, and 0≤f≤0.08;

$Li_aA_{1-b}, R_bD_2$ (0.90≤a≤1.8 and 0≤b≤0.5);

$Li_aE_{1-b}R_bO_{2-c}D_c$ (0.90≤a≤1.8, 0≤b≤0.5 and 0≤c≤0.05);

$Li_aNi_{1-b-c}CO_bR_cO_{2-d}Z_d$ where 0.9≤a≤1.8, 0≤b≤0.40, 0≤c≤0.05, and 0≤d≤0.05;

$Li_{1+z}Ni_{1-x-y}Co_xAl_yO_2$ where 0<x<0.3, 0<y<0.1, and 0<z<0.06.

In the above chemical formulas A is Ni, Co, Mn, or a combination thereof; D is O, F, S, P, or a combination thereof; E is Co, Mn, or a combination thereof; G is Al, Cr, Mn, Fe, Mg, La, Ce, Sr, V, or a combination thereof; R is Al, Ni, Co, Mn, Cr, Fe, Mg, Sr, V, Zr, Ti, a rare earth element, or a combination thereof; Z is F, S, P, or a combination thereof. Suitable cathodes include those disclosed in U.S. Pat. Nos. 5,962,166; 6,680,145; 6,964,828; 7,026,070; 7,078,128; 7,303,840; 7,381,496; 7,468,223; 7,541,114; 7,718,319; 7,981,544; 8,389,160; 8,394,534; and 8,535,832, and the references therein. By "rare earth element" is meant the lanthanide elements from La to Lu, and Y and Sc.

In another embodiment the cathode material is an NMC cathode; that is, a LiNiMnCoO cathode. More specifically, cathodes in which the atomic ratio of Ni:Mn:Co is 1:1:1 ($Li_aNi_{1-b-c}Co_bR_cO_{2-d}Z_d$ where $0.98 \leq a \leq 1.05$, $0 \leq d \leq 0.05$, b=0.333, c=0.333, where R comprises Mn) or where the atomic ratio of Ni:Mn:Co is 5:3:2 ($Li_aNi_{1-b-c}Co_bR_cO_{2-d}Z_d$ where $0.98 \leq a \leq 1.05$, $0 \leq d \leq 0.05$, c=0.3, b=0.2, where R comprises Mn).

In another embodiment, the cathode comprises a material of the formula $Li_aMn_bJ_cO_4Z_d$, wherein J is Ni, Co, Mn, Cr, Fe, Cu, V, Ti, Zr, Mo, B, Al, Ga, Si, Li, Mg, Ca, Sr, Zn, Sn, a rare earth element, or a combination thereof; Z is F, S, P, or a combination thereof; and $0.9 \leq a \leq 1.2$, $1.3 \leq b \leq 2.2$, $0 \leq c \leq 0.7$, $0 \leq d \leq 0.4$.

In another embodiment, the cathode in the electrochemical cell or lithium ion battery disclosed herein comprises a cathode active material exhibiting greater than 30 mAh/g capacity in the potential range greater than 4.6 V versus a Li/Li$^+$ reference electrode. One example of such a cathode is a stabilized manganese cathode comprising a lithium-containing manganese composite oxide having a spinel structure as cathode active material. The lithium-containing manganese composite oxide in a cathode suitable for use herein comprises oxides of the formula $Li_xNi_yM_zMn_{2-y-z}O_{4-d}$, wherein x is 0.03 to 1.0; x changes in accordance with release and uptake of lithium ions and electrons during charge and discharge; y is 0.3 to 0.6; M comprises one or more of Cr, Fe, Co, Li, Al, Ga, Nb, Mo, Ti, Zr, Mg, Zn, V, and Cu; z is 0.01 to 0.18; and d is 0 to 0.3. In one embodiment in the above formula, y is 0.38 to 0.48, z is 0.03 to 0.12, and d is 0 to 0.1. In one embodiment in the above formula, M is one or more of Li, Cr, Fe, Co and Ga. Stabilized manganese cathodes may also comprise spinel-layered composites which contain a manganese-containing spinel component and a lithium rich layered structure, as described in U.S. Pat. No. 7,303,840.

In another embodiment, the cathode comprises a composite material represented by the structure of Formula:

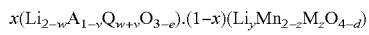

wherein:
x is about 0.005 to about 0.1;
A comprises one or more of Mn or Ti;
Q comprises one or more of Al, Ca, Co, Cr, Cu, Fe, Ga, Mg, Nb, Ni, Ti, V, Zn, Zr or Y;
e is 0 to about 0.3;
v is 0 to about 0.5.
w is 0 to about 0.6;
M comprises one or more of Al, Ca, Co, Cr, Cu, Fe, Ga, Li, Mg, Mn, Nb, Ni, Si, Ti, V, Zn, Zr or Y;
d is 0 to about 0.5;
y is about 0 to about 1; and
z is about 0.3 to about 1; and
wherein the $Li_yMn_{2-z}M_zO_{4-d}$ component has a spinel structure and the $Li_{2-w}Q_{w+v}A_{1-v}O_{3-e}$ component has a layered structure.

In another embodiment, in the Formula

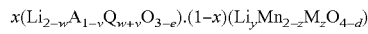

x is about 0 to about 0.1, and all ranges for the other variables are as stated herein above.

In another embodiment, the cathode in the lithium ion battery disclosed herein comprises

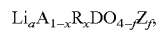

wherein:
A is Fe, Mn, Ni, Co, V, or a combination thereof;
R is Al, Ni, Co, Mn, Cr, Fe, Mg, Sr, V, Zr, Ti, a rare earth element, or a combination thereof;
D is P, S, Si, or a combination thereof;
Z is F, Cl, S, or a combination thereof;
$0.8 \leq a \leq 2.2$;
$0 \leq x \leq 0.3$; and
$0 \leq f \leq 0.1$.

In another embodiment, the cathode in the lithium ion battery or electrochemical cell disclosed herein comprises a cathode active material which is charged to a potential greater than or equal to about 4.1 V, or greater than or equal to 4.35 V, or greater than or equal to 4.5 V, or greater than or equal to 4.6 V versus a Li/Li$^+$ reference electrode. Other examples are layered-layered high-capacity oxygen-release cathodes such as those described in U.S. Pat. No. 7,468,223 charged to upper charging potentials above 4.5 V.

In some embodiments, the cathode comprises a cathode active material exhibiting greater than 30 mAh/g capacity in the potential range greater than 4.6 V versus a Li/Li$^+$ reference electrode, or a cathode active material which is charged to a potential greater than or equal to 4.35 V versus a Li/Li$^+$ reference electrode.

A cathode active material suitable for use herein can be prepared using methods such as the hydroxide precursor method described by Liu et al (*J. Phys. Chem. C* 13:15073-15079, 2009). In that method, hydroxide precursors are precipitated from a solution containing the required amounts of manganese, nickel and other desired metal(s) acetates by the addition of KOH. The resulting precipitate is oven-dried and then fired with the required amount of LiOH.H$_2$O at about 800° C. to about 1000° C. in oxygen for 3 to 24 hours. Alternatively, the cathode active material can be prepared using a solid phase reaction process or a sol-gel process as described in U.S. Pat. No. 5,738,957 (Amine).

A cathode, in which the cathode active material is contained, suitable for use herein may be prepared by methods such as mixing an effective amount of the cathode active material (e.g. about 70 wt % to about 97 wt %), a polymer binder, such as polyvinylidene difluoride, and conductive carbon in a suitable solvent, such as N-methylpyrrolidone, to generate a paste, which is then coated onto a current collector such as aluminum foil, and dried to form the cathode.

An electrochemical cell or lithium ion battery as disclosed herein further contains an anode, which comprises an anode active material that is capable of storing and releasing lithium ions. Examples of suitable anode active materials include, for example, lithium alloys such as lithium-aluminum alloy, lithium-lead alloy, lithium-silicon alloy, and lithium-tin alloy; carbon materials such as graphite and mesocarbon microbeads (MCMB); phosphorus-containing materials such as black phosphorus, MnP$_4$ and CoP$_3$; metal oxides such as SnO$_2$, SnO and TiO$_2$; nanocomposites containing antimony or tin, for example nanocomposites containing antimony, oxides of aluminum, titanium, or molybdenum, and carbon, such as those described by Yoon et al (*Chem. Mater.* 21, 3898-3904, 2009); and lithium titanates such as $Li_4Ti_5O_{12}$ and $LiTi_2O_4$. In one embodiment, the anode active material is lithium titanate or graphite. In another embodiment, the anode is graphite.

An anode can be made by a method similar to that described above for a cathode wherein, for example, a binder such as a vinyl fluoride-based copolymer is dissolved or dispersed in an organic solvent or water, which is then mixed with the active, conductive material to obtain a paste. The paste is coated onto a metal foil, preferably aluminum or copper foil, to be used as the current collector. The paste is dried, preferably with heat, so that the active mass is bonded to the current collector. Suitable anode active materials and anodes are available commercially from companies such as Hitachi, NEI Inc. (Somerset, N.J.), and Farasis Energy Inc. (Hayward, Calif.).

The electrochemical cell as disclosed herein can be used in a variety of applications. For example, the electrochemical cell can be used for grid storage or as a power source in various electronically powered or assisted devices ("Electronic Device") such as a computer, a camera, a radio, a power tool, a telecommunications device, or a transportation device (including a motor vehicle, automobile, truck, bus or airplane). The present disclosure also relates to an electronic device, a transportation device, or a telecommunication device comprising the disclosed electrochemical cell.

In another embodiment, there is a provided a method for forming an electrolyte composition. The method comprises combining a) the fluorinated solvent; b) the fluorinated sulfone; c) the at least one component selected from i) the borate salt; and/or the oxalate salt; and/or the fluorinated cyclic carbonate; and d) the at least one electrolyte salt; as defined herein, to form the electrolyte composition. The components can be combined in any suitable order. The step of combining can be accomplished by adding the individual components of the electrolyte composition sequentially or at the same time. In some embodiments, the components a) and b) are combined to make a first solution. After the formation of the first solution, an amount of the electrolyte salt is added to the first solution in order to produce the electrolyte composition having the desired concentration of the electrolyte salt, and then the desired amount(s) of the borate salt, the oxalate salt, and/or the fluorinated cyclic carbonate is added. In some embodiments, after formation of the first solution containing components a) and b), the desired amount(s) of the borate salt, the oxalate salt, and/or the fluorinated cyclic carbonate is added. The electrolyte salt is then added. Typically, the electrolyte composition is stirred during and/or after the addition of the components in order to form a homogeneous mixture.

EXAMPLES

The concepts disclosed herein are illustrated in the following examples. From the above discussion and these examples, one skilled in the art can ascertain the essential characteristics of the concepts disclosed herein, and without departing from the spirit and scope thereof, can make various changes and modifications to adapt to various uses and conditions.

The meaning of abbreviations used is as follows: "° C." means degrees Celsius; "g" means gram(s); "mg" means milligram(s); "μg" means microgram(s); "L" means liter(s); "mL" means milliliter(s); "μL" means microliter(s); "mol" means mole(s); "mmol" means millimole(s); "M" means molar concentration; "wt %" means percent by weight; "mw" means molecular weight; "bp" means boiling point; "mm" means millimeter(s); "μm" means micrometer(s); "ppm" means parts per million; "h" means hour(s); "min" means minute(s); "s" means second(s); "psig" means pounds per square inch gauge; "atm" means atmosphere(s); "kPa" means kiloPascal(s); "A" means amperes; "mA" mean milliampere(s); "mAh/g" mean milliamperes hour(s) per gram; "V" means volt(s); "xC" refers to a constant current which is the product of x and a current in A which is numerically equal to the nominal capacity of the battery expressed in Ah; "rpm" means revolutions per minute; "NMR" means nuclear magnetic resonance spectroscopy; "GC/MS" means gas chromatography/mass spectrometry; "GC/FID" means gas chromatography flame ionization dector; "UHMWPE" means ultra high molecular weight polyethylene; "Ex" means Example, and "Comp Ex" means Comparative Example.

Materials and Methods

Preparation of 2,2-Difluoroethyl Acetate (DFEA)

The 2,2-difluoroethyl acetate used in the following Examples was prepared by reacting potassium acetate with $HCF_2CH_2Br$. The following is a typical procedure used for the preparation.

Potassium acetate (Aldrich, Milwaukee, Wis., 99%) was dried at 100° C. under a vacuum of 0.5-1 mm of Hg (66.7-133 Pa) for 4 to 5 h. The dried material had a water content of less than 5 ppm, as determined by Karl Fischer titration. In a dry box, 212 g (2.16 mol, 8 mol % excess) of the dried potassium acetate was placed into a 1.0-L, 3 neck round bottom flask containing a heavy magnetic stir bar. The flask was removed from the dry box, transferred into a fume hood, and equipped with a thermocouple well, a dry-ice condenser, and an additional funnel.

Sulfolane (500 mL, Aldrich, 99%, 600 ppm of water as determined by Karl Fischer titration) was melted and added to the 3 neck round bottom flask as a liquid under a flow of nitrogen. Agitation was started and the temperature of the reaction medium was brought to about 100° C. $HCF_2CH_2Br$ (290 g, 2 mol, E.I. du Pont de Nemours and Co., 99%) was placed in the addition funnel and was slowly added to the reaction medium. The addition was mildly exothermic and the temperature of the reaction medium rose to 120-130° C. in 15-20 min after the start of the addition. The addition of $HCF_2CH_2Br$ was kept at a rate which maintained the internal temperature at 125-135° C. The addition took about 2-3 h. The reaction medium was agitated at 120-130° C. for an additional 6 h (typically the conversion of bromide at this point was about 90-95%). Then, the reaction medium was cooled down to room temperature and was agitated overnight. Next morning, heating was resumed for another 8 h.

At this point the starting bromide was not detectable by NMR and the crude reaction medium contained 0.2-0.5% of 1,1-difluoroethanol. The dry-ice condenser on the reaction flask was replaced by a hose adapter with a Teflon® valve and the flask was connected to a mechanical vacuum pump through a cold trap (−78° C., dry-ice/acetone). The reaction product was transferred into the cold trap at 40-50° C. under a vacuum of 1-2 mm Hg (133 to 266 Pa). The transfer took about 4-5 h and resulted in 220-240 g of crude $HCF_2CH_2OC(O)CH_3$ of about 98-98.5% purity, which was contaminated by a small amount of $HCF_2CH_2Br$ (about 0.1-0.2%), $HCF_2CH_2OH$ (0.2-0.8%), sulfolane (about 0.3-0.5%) and water (600-800 ppm). Further purification of the crude product was carried out using spinning band distillation at atmospheric pressure. The fraction having a boiling point between 106.5-106.7° C. was collected and the impurity profile was monitored using GC/MS (capillary column HP5MS, phenyl-methyl siloxane, Agilent19091S-433, 30.m, 250 μm, 0.25 μm; carrier gas —He, flow rate 1 mL/min; temperature program: 40° C., 4 min, temp. ramp 30° C./min, 230° C., 20 min). Typically, the distillation of 240 g of crude product gave about 120 g of HCF$_2$CH$_2$OC(O)CH$_3$ of 99.89% purity, (250-300 ppm H$_2$O) and 80 g of material of 99.91% purity (containing about 280 ppm of water). Water was removed from the distilled product by treatment with 3 A molecular sieves, until water was not detectable by Karl Fischer titration (i.e., <1 ppm).

Preparation of Difluoromethyl Methyl Sulfide

The following is a representative procedure used for the preparation of difluoromethyl methyl sulfide. Difluoromethyl methyl sulfide was prepared by reaction of sodium thiomethoxide with chlorodifluoromethane.

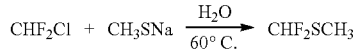

A 21 wt % solution of aqueous sodium thiomethoxide (100 mL; 21 g NaSMe; 0.30 mol; mw=70.09; Aldrich 516686) was charged to a 600-mL stirred Parr autoclave under nitrogen. The autoclave was cooled in dry ice to about −5° C. and chlorodifluoromethane (>99%; E.I. du Pont de Nemours and Co., Wilmington, Del.; 30 g; 0.35 mol; mw=86.47; bp=−41° C.) was added from a tank on a balance via a steel pressure line. Stirring was started and the autoclave was warmed to 60° C. The pressure initially increased to nearly 200 psig but then began to fall as the chlorodifluoromethane reacted; after 1 h at 60° C. the pressure was 100 psig. The reaction was allowed to stir at 60° C. for 16 h and then was cooled back to 26° C. After this time, the pressure was 31 psig.

A condenser train was attached to an autoclave head valve with rubber tubing. The tubing from the autoclave led to a 100-mL round bottom flask with a wet-ice/acetone cold finger condenser, the outlet of which led to a 200-mL round bottom flask with a dry ice condenser which vented through a nitrogen bubbler. The first flask was cooled in wet ice/acetone (−15° C.) and the second flask was cooled in dry ice. The autoclave was first vented at room temperature, and a few mL of unreacted chlorodifluoromethane condensed in the dry ice flask. The autoclave was then stirred and heated to 70° C. as the product, a mobile yellow-orange liquid, distilled out and was collected in the wet ice/acetone flask. A reported boiling point for difluoromethyl methyl sulfide is 41° C. (J. Amer. Chem. Soc. 82, 6118, 1960). After half an hour distillation ceased, so a very slow sweep of nitrogen was introduced through a second autoclave head valve to sweep out the head space through the condenser train. The product was cooled in dry ice and the small amount of water which had codistilled froze. The liquid product was drawn off with a syringe to yield 24.5 g (about 80% yield) clear, yellow-orange difluoromethyl methyl sulfide. By NMR the product contained 3.8 mol % methanethiol and a trace of chlorodifluoromethane.

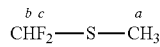

$^{19}$F NMR (CDCl$_3$): −95.92 ppm (d, J=56.1 Hz, 2F, c); −71.40 (d, J=62.9 Hz, 0.05F, CF$_2$ClH)

$^1$H NMR (CDCl$_3$): 2.28 ppm (t, J=1.0 Hz, 3H, a); 6.77 (t, J=56.1 Hz, 1H, b); 1.23 (q, J=7.4 Hz, H, CH$_3$SH); 2.07 (d, J=7.4 Hz, 0.12H, CH$_3$SH); 7.18 (t, J=62.9 Hz, 0.025H, CF$_2$ClH)

Preparation of Difluoromethyl Methyl Sulfone (DFMS)

The following is a representative procedure used for the preparation of difluoromethyl methyl sulfone. Difluoromethyl methyl sulfone was prepared by oxidation of difluoromethyl methyl sulfide.

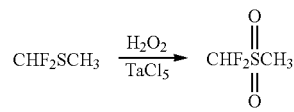

Crude difluoromethyl methyl sulfide, prepared as described herein above (24 g; 0.24 mol; mw=98.11) was stirred with 5 g potassium hydroxide pellets for 50 min to remove methanethiol. The sulfide was then distilled into a 250-mL 3-neck flask containing a thermometer, dry ice condenser, dropping funnel and magnetic stirrer. The sulfide was diluted with 30 mL of methanol and tantalum pentachloride (0.40 g; 1.1 mmol; 0.45 mol %; mw=358.21; Strem Chemicals Inc., Newbury, Mass., 93-7324) was added with stirring. The solution was cooled in an ice-water bath to 3° C. and stirred as 75 mL cold 30 wt % hydrogen peroxide (0.73 mol; D=1.11; Aldrich 216763) was added dropwise over 40 min. The internal temperature remained between 5-12° C. After addition, the bath was removed and replaced with a water bath which was heated to 60° C. The dry ice condenser was kept in place for the first hour of heating since there was initially some condensation and reflux while the bath temperature was still below 50° C. The dry ice condenser was then replaced with a cold water condenser as the mixture was stirred at 60° C. for 25 h.

By NMR there was about 3% sulfoxide remaining, so 5 mL (0.06 mol) more 30% hydrogen peroxide was added all at once and the mixture was stirred at 60° C. for 24 h more. Then, 20 g of sodium sulfite (0.16 mol; mw=126.04) was added to destroy the remaining hydrogen peroxide and the mixture was extracted 3 times with 30 mL portions of dichloromethane. The extracts were combined and dried with magnesium sulfate and filtered. The filtrate was distilled at 1 atm (101 kPa) through a short-path still to remove about half the dichloromethane. The distillate appeared to have some water present which tested strongly positive with a peroxide test strip, indicating that not all the peroxide in the reaction was decomposed, so the pot solution (about 50 mL) was filtered through a bed of activity 1 basic alumina. The filtrate still tested positive for peroxide, so about 100 mg of manganese dioxide was added to the pot, the dichloromethane was distilled off, and the pot was stirred in a 70° C. oil bath for 20 h to decompose any residual peroxide. The black mixture was filtered and the light tan filtrate (24.7 g) was distilled from an 80° C. oil bath through a 10-cm Vigreaux column. A clear, colorless fraction was collected (19 g; 39-41° C./1 torr) which was 99.8% pure sulfone by NMR.

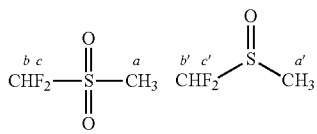

$^{19}$F NMR (CDCl$_3$): −124.60 ppm (d of q, J=1.7 Hz, 52.7 Hz, 2F, c)

$^1$H NMR (CDCl$_3$): 3.01 ppm (t, J=1.5 Hz, 3H, a); 6.26 (t, J=52.6 Hz, 0.98H, b)

The sulfoxide intermediate has the following NMR peak assignments: 2.67 ppm (t, J=1.6 Hz, a'); 6.37 ppm (t, J=54.6 Hz, b'); −124.26 (d of q, J=1.7 Hz, 55.0 Hz, c')

The difluoromethyl methyl sulfone used in Example 2 and Comparative Example C was 99.8% pure by NMR.

The difluoromethyl methyl sulfone used in Comparative Example B and Example 1 was further purified by filtration through Celite, spinning band distillation, and then bulb-to-bulb distillation to a purity >99.99% by GC/FID.

Lithium Bis(Oxalate)Borate Purification

In a nitrogen purged dry box, lithium bis(oxalate)borate (LiBOB, Sigma-Aldrich, Milwaukee, Wis.) was purified by the following procedure. 11.25 g of LiBOB was added to a 400 mL beaker with 50 mL anhydrous acetonitrile. The mixture was stirred and heated to 40° C. for about 30 minutes. The warm mixture was filtered through a Whatman #1 filter and transferred into a second beaker and allow to cool to room temperature. A clear solution was obtained. To this clear solution, about 50 mL of cold anhydrous toluene (−30° C.) was added. This was stirred for an additional 30 minutes to form a precipitate. The solution was filtered through a Whatman #1 filter and the filter cake was washed again with the cold anhydrous toluene. After allowing the filter cake to dry on the vacuum filtration funnel, the solids were removed from the dry box and placed in a vacuum oven at 130° C. and dried with a slight nitrogen purge for 15 hours to form the final product, which was subsequently handled in the nitrogen purged drybox.

Comparative Examples A and B, and

Example 1

Preparation of LiMn$_{1.5}$Ni$_{0.45}$Fe$_{0.05}$O$_4$ (Fe-LNMO) Cathode Active Material The following is a typical procedure used for the preparation of the cathode active material used in Comparative Example A, Comparative Example B, and Example 1 herein. For the preparation of LiMn$_{1.5}$Ni$_{0.45}$Fe$_{0.05}$O$_4$, 401 g manganese (II) acetate tetrahydrate (Aldrich, Milwaukee Wis., Product No. 63537), 125 g nickel (II) acetate tetrahydrate (Aldrich, Product No. 72225) and 10 g iron (II) acetate anhydrous (Alfa Aesar, Ward Hill, Mass., Product No. 31140) were weighed into bottles on a balance, then dissolved in 5.0 L of deionized water. KOH pellets were dissolved in 10 L of deionized water to produce a 3.0 M solution inside a L reactor. The solution containing the metal acetates was transferred to an addition funnel and dripped into the rapidly stirred reactor to precipitate the mixed hydroxide material. Once all 5.0 L of the metal acetate solution was added to the reactor, stirring was continued for 1 h. Then, stirring was stopped and the precipitate was allowed to settle overnight. After settling, the liquid was removed from the reactor and 15 L of fresh deionized water was added. The contents of the reactor were stirred, allowed to settle again, and the liquid was removed. This rinse process was repeated. Then, the precipitate was transferred to two (split evenly) coarse glass frit filtration funnels covered with Dacron® paper. The solids were rinsed with deionized water until the filtrate pH reached 6.0 (pH of deionized rinse water), and a further 20 L of deionized water was added to each filter cake. Finally, the cakes were dried in a vacuum oven at 120° C. overnight. The yield at this point was typically 80-90%.

The hydroxide precipitate was ground and mixed with lithium carbonate. This step was done in 50 g batches using a Pulverisette automated mortar and pestle (FRITSCH, Germany). For each batch the hydroxide precipitate was weighed, then ground alone for 5 min in the Pulveresette. Then, a stoichiometric amount with small excess of lithium carbonate was added to the system. For 50 g of hydroxide precipitate, 10.5 g of lithium carbonate was added. Grinding was continued for a total of 60 min with stops every 10-15 min to scrape the material off the surfaces of the mortar and pestle with a sharp metal spatula. If humidity caused the material to form clumps, it was sieved through a 40 mesh screen once during grinding, then again following grinding.

The ground material was fired in an air box furnace inside shallow rectangular alumina trays. The trays were 158 mm by 69 mm in size, and each held about 60 g of material. The firing procedure consisted of ramping from room temperature to 900° C. in 15 h, holding at 900° C. for 12 h, then cooling to room temperature in 15 h.

After firing, the powder was ball-milled to reduce particle size. Then, 54 g of powder was mixed with 54 g of isopropyl alcohol and 160 g of 5 mm diameter zirconia beads inside a polyethylene jar. The jar was then rotated on a pair of rollers for 6 h to mill. The slurry was separated by centrifugation, and the powder was dried at 120° C. to remove moisture.

Cathode Preparation

The following is a typical procedure used for the preparation of the cathodes used in Comparative Example A, Comparative Example B, and Example 1 herein. The binder was prepared as a 6% solution of polyvinylidene fluoride in N-methylpyrrolidone (Solef® 6020, Solvay, Houston, Tex.). The following materials were used to make an electrode paste: 4.3 g LiMn$_{1.5}$Ni$_{0.45}$Fe$_{0.05}$O$_4$ Fe-LNMO cathode active powder as prepared above; 0.35 g carbon black (Timcal Super C65); 5.8 g PVDF (polyvinylidene difluoride) solution; and 7.5 g+1.3 g NMP (Sigma Aldrich). The materials were combined in a ratio of 86:7:7, cathode active powder:PVDF:carbon black, as described below.

The carbon black, the first portion of NMP, and the PVDF solution were first combined and mixed. The cathode active powder and the 15 second portion of NMP were added and the paste was mixed again. The resulting paste was then homogenized.

After homogenization, the paste was cast onto 25 μm thick aluminum foil. The electrodes were dried at elevated temperature and calendared. Loadings of cathode active material were approximately 9 mg/cm$^2$.

Anode Preparation

The following is a typical procedure used for the preparation of the anodes used in the Examples herein. An anode paste was prepared from the following materials: 5.00 g graphite (CPreme® G5, Conoco-Philips, Huston, Tex.); 0.2743 g carbon black (Super C65, Timcal, Westlake, Ohio); 3.06 g PVDF (13% in NMP. KFL #9130, Kureha America Corp.); 11.00 g 1-methyl-2-pyrrolidinone (NMP); and 0.0097 g oxalic acid. The materials were combined in a ratio of 88:0.17:7:4.83, graphite:oxalic acid PVDF:carbon black, as described below. The final paste contained 29.4% solids.

Oxalic acid, carbon black, NMP, and PVDF solution were combined in a plastic vial. The materials were mixed for 60 s at 2000 rpm using a planetary centrifugal mixer. The mixing was repeated a second time. The graphite was then added. The resulting paste was centrifugally mixed two times. The vial was mounted in an ice bath and homogenized twice using a rotor-stator for 15 min each time at 6500 rpm and then twice more for 15 min at 9500 rpm. The point where the stator shaft entered the vial was wrapped with aluminum foil to minimize water vapor ingress to the vial. Between each of the four homogenization periods, the homogenizer was moved to another position in the paste vial. The paste was then centrifugally mixed three times.

The paste was cast using a doctor blade with a 230 μm gate height on to copper foil (CF-LBX-10, Fukuda, Kyoto, Japan) using the automatic coater. The electrodes were dried for 30 min at 95° C. in the mechanical convection oven. The resulting 51-mm wide anodes were placed between 125 μm thick brass sheets and passed through a calender three times using 100 mm diameter steel rolls at ambient temperature with nip forces increasing in each of the passes, starting at 260 kg with the final pass at 770 kg. Loadings of anode active material were approximately 4.0-4.5 mg/cm$^2$.

Coin Cells

For Examples 1 and 2, and for Comparative Examples A, B, and C, circular anodes 14.3 mm diameter and cathodes 12.7 mm diameter were punched out from the electrode sheets described herein, placed in a heater in the antechamber of a glove box (Vacuum Atmospheres, Hawthorne, CA, with HE-493 purifier), further dried under vacuum overnight at 90° C., and brought into an argon-filled glove box. Nonaqueous electrolyte lithium-ion CR2032 coin cells were prepared for electrochemical evaluation. The coin cell parts (case, spacers, wave spring, gasket, and lid) and coin cell crimper were obtained from Hohsen Corp (Osaka, Japan). The separator was a Celgard 2500 (Celgard/Polypore International, Charlotte, N.C.). The nonaqueous electrolytes used in the preparation of the coin cells are described below.

Electrolyte Preparation

For Comparative Example A, the electrolyte composition was prepared by combining 70 weight percent of 2,2-difluoroethyl acetate (DFEA) and 30 weight percent ethylene carbonate (EC, BASF, Independence, Ohio) in a nitrogen purged drybox. Molecular sieves (3 A) were added and the mixture was dried to less than 1 ppm water. After filtration with a 0.25 micron PTFE syringe filter, sufficient LiPF$_6$ (lithium hexafluorophosphate, BASF, Independence, Ohio) was added to make the final electrolyte composition 1 M in LiPF$_6$.

For Comparative Example B, the electrolyte composition was prepared by combining 35 weight percent of 2,2-difluoroethyl acetate, 35 weight percent difluoromethyl methyl sulfone (DFMS), and 30 weight percent ethylene carbonate in a nitrogen purged drybox. Molecular sieves (3A) were added and the mixture was dried to less than 1 ppm water. After filtration with a 0.25 micron PTFE syringe filter, sufficient LiPF$_6$ was added to make the final electrolyte composition 1 M in LiPF$_6$.

For Example 1, the electrolyte composition was prepared by combining 35 weight percent of 2,2-difluoroethyl acetate, 35 weight percent difluoromethyl methyl sulfone, and 30 weight percent ethylene carbonate in a nitrogen purged drybox. Molecular sieves (3A) were added and the mixture was dried to less than 1 ppm water. After filtration with a 0.25 micron PTFE syringe filter, sufficient LiPF$_6$ was added to make the formulation 1 M in LiPF$_6$. 1.96 g of this mixture was then combined with 0.04 g of purified LiBOB to make the final electrolyte composition.

Coin Cell Evaluation at 55° C.

Comparative Example A, Comparative Example B, and Example 1

Each of the electrolyte compositions of Comparative Example A, Comparative Example B, and Example 1 were used to fabricate three coin cells, for a total of nine cells. The coin cells were cycled twice for formation using a commercial battery tester (Series 4000, Maccor, Tulsa, Okla.) at ambient temperature using constant current charging and discharging between voltage limits of 3.4-4.9 V and using constant currents (CC) of 12 mA per g of cathode active material. Following the formation procedure, the cells were placed in an oven at 55° C. and cycled using constant current charging and discharging between voltage limits of 3.4-4.9 V at a current of 240 mA per gram of cathode active material, which is approximately a 2 C rate for 250 cycles.

For the coin cells containing the electrolyte compositions of Comparative Example A, Comparative Example B, and Example 1, the discharge capacity retention at 250 cycles at 55° C. is given in Table 1 as a percentage of the as-fabricated cell capacity. The as-fabricated cell capacity is calculated by multiplying the mass of cathode active material by 120 mAh/g, which is the mass-normalized capacity of the cathode active material.

TABLE 1

Capacity Retention from Coin Cell Cycling Data for Comparative Example A, Comparative Example B, and Example 1

| Example | Electrolyte Composition | Coin Cell | Capacity Retention at 250 Cycles (%) | Average Capacity Retention at 250 Cycles (mAh/g) |
|---|---|---|---|---|
| Comp. Ex. A | 70 wt % DFEA, 30 wt % EC, 1M LiPF$_6$ | A-1 A-2 A-3 | 37.60 37.04 38.71 | 37.79 |
| Comp. Ex. B | 35 wt % DFEA, 35 wt % DFMS, 30 wt % EC, 1M LiPF$_6$ | B-1 B-2 B-3 | NA NA NA | NA |
| Ex. 1 | 35 wt % DFEA, 35 wt % DFMS, 30 wt % EC, 1M LiPF$_6$, 2 wt % LiBOB | 1-1 1-2 1-3 | 52.08 58.07 60.14 | 56.77 |

Note:
NA means "not applicable"; the cell did not cycle

The first attempt to charge the coin cells containing the electrolyte composition of Example 1 at 25° C. is shown graphically in FIG. 1. The data for each of the three coin cells 1-1, 1-2, and 1-3 are overlaid, forming a single line.

Figure 2:
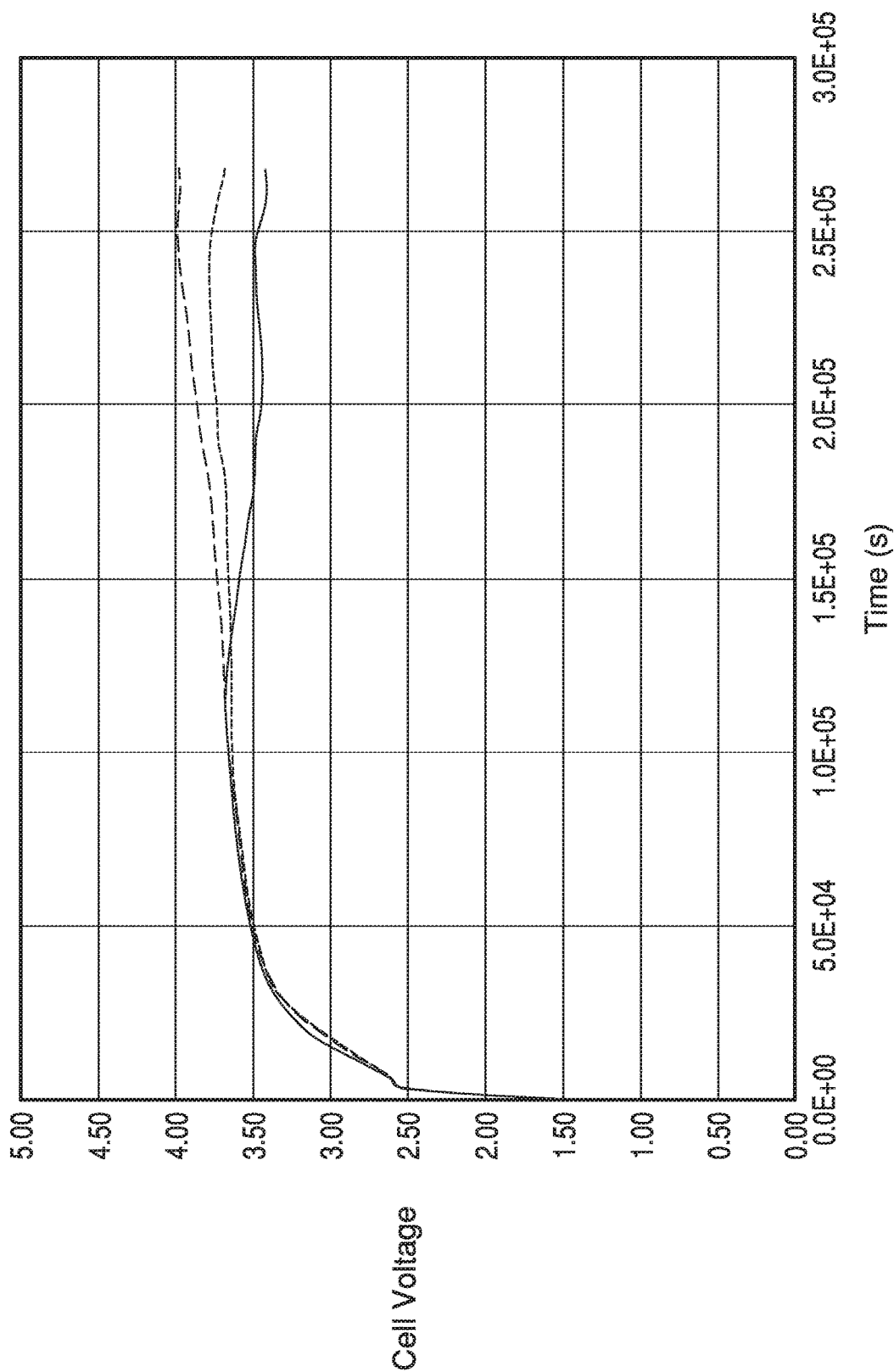
FIG. 2 shows the voltage profiles at 25° C. for the coin cells containing the electrolyte of Comparative Example B.

The first attempt to charge the coin cells containing the electrolyte composition of Comparative Example B at 25° C. is shown graphically in FIG. 2. The data for each of the three coin cells is shown as follows: B-1 is the middle line of shorter dashes, B-2 is the bottom solid line, and B-3 is the top line of longer dashes.

FIGS. 1 and 2, and the data in Table 1, demonstrate that the cells containing the electrolyte composition of Comparative Example A were able to retain some capacity at 250 cycles, while the cells containing the electrolyte composition of Comparative Example B were not able to complete a single charge. In contrast, the cells containing the electrolyte composition of Example 1 were able to charge and had improved capacity retention relative to that of the Comparative Example A.

Example 2 and

Comparative Example C

Cathode Preparation
Preparation of Primer on Aluminum Foil Current Collector Using a Polyimide/Carbon Composite The following is a typical procedure used for the preparation of primer on the aluminum foil current collector used in Example 2 and Comparative Example C. To prepare the polyamic acid, a prepolymer was first prepared. 20.6 wt 10% of PMDA:ODA prepolymer was prepared using a stoichiometry of 0.98:1 PMDA/ODA (pyromellitic dianhydride// ODA (4,4'-diaminodiphenyl ether) prepolymer). This was prepared by dissolving ODA in N-methylpyrrolidone (NMP) over the course of approximately 45 minutes at room temperature with gentle agitation. PMDA powder was slowly added (in small aliquots) to the mixture to control any temperature rise in the solution; the addition of the PMDA was performed over approximately two hours. The addition and agitation of the resulting solution under controlled temperature conditions. The final concentration of the polyamic acid was 20.6 wt % and the molar ratio of the anhydride to the amine component was approximately 0.98:1. In a separate container, a 6 wt % solution of pyromellitic anhydride (PMDA) was prepared by combining 1.00 g of PMDA (Aldrich 412287, Allentown, Pa.) and 15.67 g of NMP (N-methylpyrrolidone). 4.0 grams of the PMDA solution was slowly added to the prepolymer and the viscosity was increased to approximately 90,000 poise (as measured by a Brookfield 25 viscometer-#6 spindle). This resulted in a finished prepolymer solution in which the calculated final PMDA:ODA ratio was 1.01:1. 5.196 grams of the finished prepolymer was then diluted with 15.09 grams of NMP to create a 5 wt % solution. In a vial, 16.2342 grams of the diluted finished prepolymer solution was added to 0.1838 grams of TimCal 30 Super C-65 carbon black. This was further diluted with 9.561 grams of NMP for a final solids content of 3.4 wt %, with a 2.72 prepolymer:carbon ratio. A Paasche VL #3 Airbrush sprayer (Paasche Airbrush Company, Chicago, Ill.) was used to spray this material onto the aluminum foil (25 μm thick, 1145-0, Allfoils, Brooklyn Heights, Ohio). The foil was weighed prior to spraying to identify the necessary coating to reach a desired density of 0.06 mg/cm². The foil was then smoothed onto a glass plate, and sprayed by hand with the airbrush until coated. The foil was then dried at 125° C. on a hot plate, and measured to ensure that the desired density was reached. The foil was found to be coated with 0.06 mg/cm² of the polyamic acid. Once the foil was dried and at the desired coating, the foil was imidized at 400° C. following the imidization procedure below:

40° C. to 125° C. (ramp at 4° C./min)
125° C. to 125° C. (soak 30 min)
125° C. to 250° C. (ramp at 4° C./min)
250° C. to 250° C. (soak 30 min)
250° C. to 400° C. (ramp at 5° C./min)
400° C. to 400° C. (soak 20 min).

Preparation of $LiMn_{1.5}Ni_{0.45}Fe_{0.05}O_4$ (Fe-LNMO) Cathode Active Material The following is a representative procedure used for the preparation of the cathode active material used in Example 2 and Comparative Example C herein. For the preparation of $LiMn_{1.5}Ni_{0.45}Fe_{0.05}O_4$, 2.4 kg manganese (II) acetate tetrahydrate (Alfa Aesar, Ward Hill, Mass., Product No. 12351), 0.74 kg nickel (II) acetate tetrahydrate (Acros, Product No. 223140025) and 89 g iron (III) chloride hexahydrate (Sigma Aldrich, Product No. 157740) were weighed on a balance, then dissolved in 25 L of deionized water. KOH pellets were dissolved in 40 L of deionized water to produce a 30% solution inside a 80 L reactor. The solution containing the metal salts was transferred to the rapidly stirred reactor through a misting nozzle to precipitate the mixed hydroxide material. Once all of the metal salt solution was added to the reactor, stirring was continued for 1 h. Then, stirring was stopped and the precipitate was allowed to settle overnight. After settling, the liquid was removed from the reactor and 50 L of fresh deionized water was added. The contents of the reactor were stirred, allowed to settle again, and the liquid was removed. This rinse process was repeated. Then, the precipitate was transferred to a Nutsche filter where it was filtered with polypropylene media of 4 micron nominal pore size. The solids were rinsed with pressurized deionized water until the filtrate pH reached 5.5. Finally, the cake was dried in the filter with heat from the steam jacket and flowing nitrogen through the cake. The dried hydroxide weighed 1090 g.

The hydroxide precipitate was ground and mixed with 222.5 g lithium carbonate. This step was done by ball milling the hydroxide precipitate and lithium carbon in isopropyl alcohol inside a high density polyethylene bottle with yttria-stabilized zirconia media. The bottle was rolled for 24 hours to mix and mill. Then it was filtered to remove the isopropyl alcohol, and dried in a vacuum oven.

The ground material was fired in an air box furnace inside alumina trays. The firing procedure consisted of ramping from room temperature to 900° C. in 15 h, holding at 900° C. for 12 h, then cooling to room temperature in 15 h.

After firing, the powder was ball-milled to reduce particle size. It was milled in isopropyl alcohol inside a polyethylene bottle with yttria-stabilized zirconia media for 10 hours. Then it was filtered to remove the isopropyl alcohol, and dried in a vacuum oven.

Finally, the dried powder was fired by heating to 700° C. in 5 h, holding at 700° C. for 3 h and cooling to room temperature in 12.5 h.

Preparation of the Paste

The following is a typical procedure used for the preparation of the cathodes used in Example 2 and Comparative Example C. The binder used was a Kureha 7200 PVDF resin powder Batch #34E08 (Japan). The binder resin was diluted to a 6 wt % solution in N-methylpyrrolidone, (NMP, Sigma Aldrich, St. Louis, Mo.). The following materials were used to make an electrode paste: 2.2575 g cathode active powder; 0.1838 g carbon black (Conoco Super C65), 1.53 g PVDF (polyvinylidene difluoride/NMP solution) (Kureha 7200) diluted with 2.5665 g NMP and a second portion of 0.4610 g NMP (Sigma Aldrich). The materials were combined in a ratio of 86:7:7, cathode active powder:PVDF:carbon black, as described below. The final paste contained 37.5 wt % solids.

The carbon black (C65), the first portion of NMP, and the PVDF solution were first combined in a plastic THINKy container and centrifugally mixed (ARE-310, Thinky USA, Inc., Laguna Hills, Calif.) for 2 minutes at 2000 rpm. The cathode active powder and the second portion of NMP were added and the paste was centrifugally mixed once again at 2000 rpm for 2 minutes. An ultrasonic horn was immersed into the paste and ultrasonic energy was applied for approximately three seconds.

Coating and Calendering the Cathode Electrode

The following is a typical procedure used for the preparation of the cathodes used in Example 2 and Comparative Example C. The paste was manually cast using doctor blades with a 6 mil gate height plus 4 mil of Kapton® tape to produce a total gate opening of 10 mils onto the primed aluminum foil. The electrodes were dried for 60 minutes at 90° C. in a vacuum oven. The resulting 51-mm wide cathodes were placed between 125 mm thick brass sheets and passed through a calendar three times using 100 mm diameter steel rolls at 125° C. with pressure increasing in each pass, at pressures of 18 psi, 24 psi, and 30 psi. The calendar is set to have a nip force (in lb)=37.8× regulator pressure (psi). Loadings of cathode active material were approximately 9.64-9.84 mg/cm$^2$.

Electrolyte Preparation

For Example 2, the electrolyte composition was prepared by combining 2.2842 g of 2,2-difluoroethyl acetate (DFEA) and 0.9936 g of difluoromethyl methyl sulfone (DFMS). The mixture was dried over 3A molecular sieves until the water content was below 1 ppm by Karl Fischer titration. The mixture was filtered using a 0.2 micron PTFE syringe filter and 0.3952 g of LiPF$_6$ (BASF 5/2012, Independence, Ohio) was then added. 0.75 g of this mixture was combined with 0.0076 g of fluoroethylene carbonate (FEC) (BASF, independence, OH) to prepare the final electrolyte composition.

For Comparative Example C, the electrolyte composition was prepared following the procedure for Example 2, with the exception that no fluoroethylene carbonate was added.

Coin Cell Evaluation at 55° C.

Example 2 and Comparative Example C

Each of the electrolyte compositions of Example 2 and Comparative Example C were used to fabricate three coins cells, for a total of six cells. The anode electrodes were prepared as for Example 1 above. The coin cells of Example 2 had an anode active component loading of approximately 4.17 mg/cm$^2$-4.34 mg/cm$^2$, and a cathode active component loading of approximately 9.64 mg/cm$^2$-9.84 mg/cm$^2$. The coin cells of Comparative Example C had an anode active component loading of approximately 3.90 mg/cm$^2$-4.06 mg/cm$^2$, and a cathode active component loading of approximately 9.17 mg/cm$^2$-9.84 mg/cm$^2$.

The coin cells were cycled twice for formation using a commercial battery tester (Series 4000, Maccor, Tulsa, Okla.) at ambient temperature using constant current charging and discharging between potential limits of 3.4-4.9 V at a current of 12 mA per gram of cathode active material, which is approximately a 0.1 C rate. The coin cells were placed in an oven at 55° C. and cycled using constant current charging and discharging between voltage limits of 3.4-4.9 V at a current of 240 mA per gram of cathode active material, which is approximately a 2 C rate.

For the coin cells containing the electrolyte compositions of Example 2 and Comparative Example C, the cycle life 80% value is given in Table 2. The cycle life was measured as the number of cycles required to reduce the discharge capacity to 80% of the original discharge capacity of the battery measured in the second cycle of cycling at 55° C.

TABLE 2

| Cycle Life 80% from Coin Cell Cycling Data for Example 2 and Comparative Example C | | | |
|---|---|---|---|
| Example | Electrolyte Composition | Coin Cell | Cycle Life 80% |
| Ex. 2 | 70 wt % DFEA, | 2-1 | 133 |
|  | 30 wt % DFMS, | 2-2 | 91 |
|  | 1M LiPF$_6$, | 2-3 | 49 |
|  | 1 wt % FEC |  |  |
| Comp. Ex. C | 70 wt % DFEA, | C-1 | NA |
|  | 30 wt % DFMS, | C-2 | NA |
|  | 1M LiPF$_6$ | C-3 | NA |

Note:
NA means "not applicable"; the cell did not cycle

Of the coin cells containing the electrolyte composition of Example 2, coin cell 2-1 retained 80% of its initial discharge capacity at 133 cycles; coin cell 2-2, 91 cycles, and coin cell 2-3, 49 cycles. In contrast, the coin cells containing the electrolyte composition of Comparative Example C did not cycle.

Figure 3:
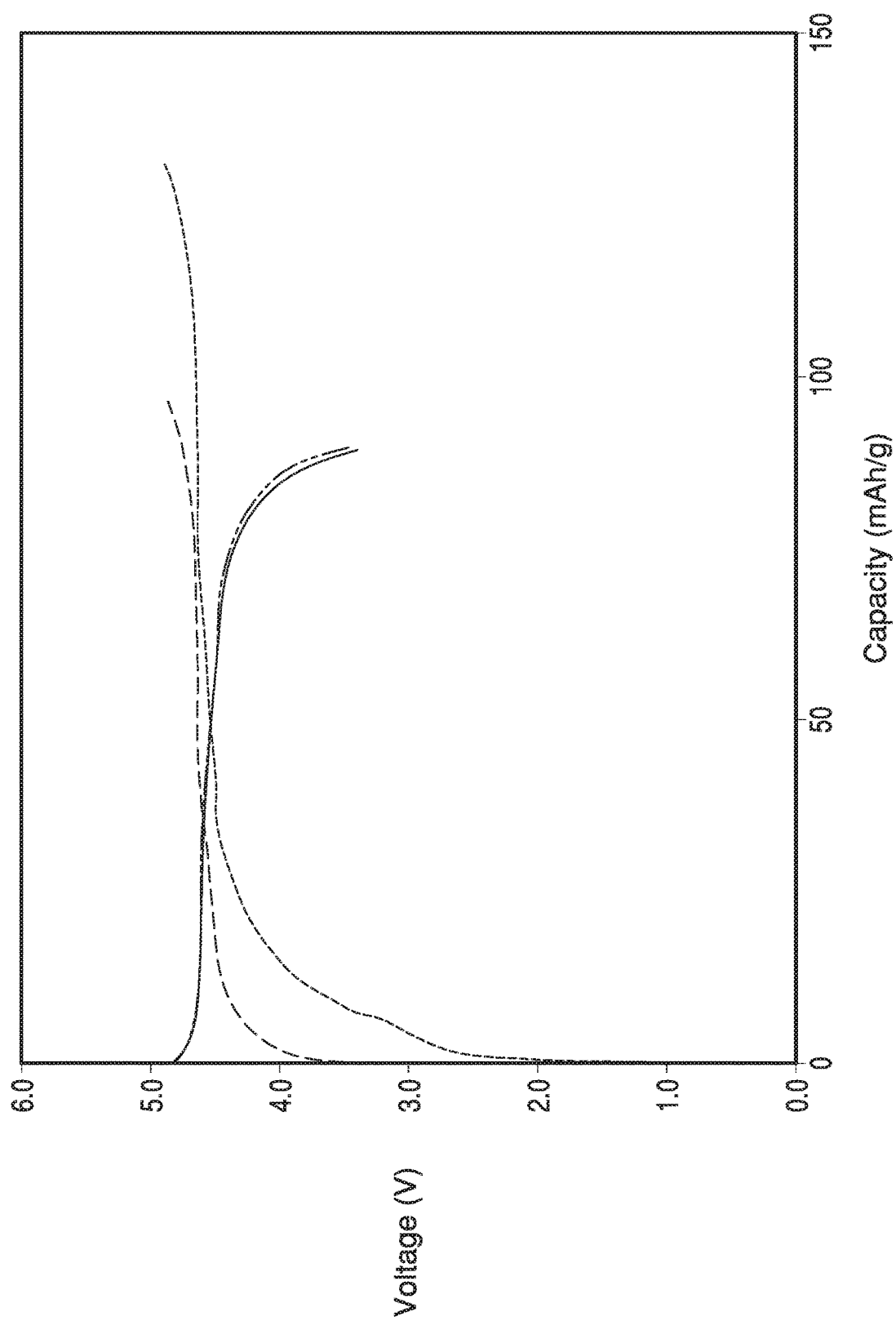
FIG. 3 is a graphical representation of the first and second charge/discharge curves for the coin cells containing the electrolyte of Example 2.
Figure 4:
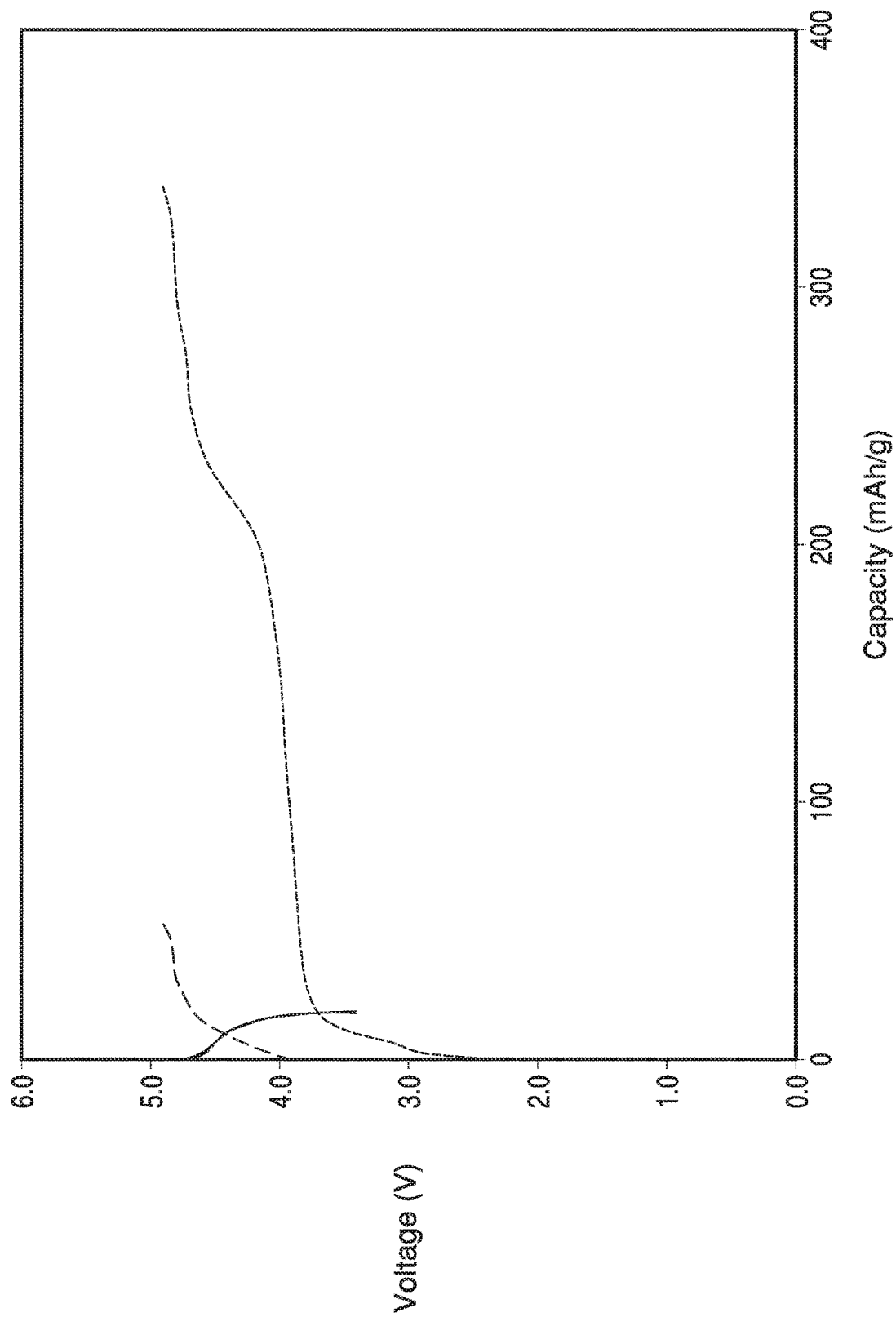
FIG. 4 is a graphical representation of the first and second charge/discharge curves for the coin cells containing the electrolyte of Comparative Example C.

The first and second charge/discharge curves for the coin cells containing the electrolyte composition of Example 2 are shown graphically in FIG. 3. In FIG. 3, the first cycle charge curve is the line composed of shorter dashes; the first cycle discharge curve is the solid line. The second cycle charge curve is the line composed of longer dashes; the 15 second cycle discharge curve is composed of repeating units of two short and one long dash. Note that the first and second cycle discharge curves are nearly overlaid. The analogous curves for the coin cells containing the electrolyte composition of Comparative Example C are shown in FIG. 4. In FIG. 4, the first cycle charge curve is the line composed of shorter dashes; the first cycle discharge curve is the solid line. The second cycle charge curve is the line composed of longer dashes; the second cycle discharge curve overlays the first cycle discharge curve.

FIGS. 3 and 4, and the data in Table 2, indicate that without fluoroethylene carbonate, the electrolyte composition containing the fluorinated solvent and the fluorinated sulfone did not properly complete a formation cycle. As can be seen in the FIG. 4, for Comparative Example C the cycle 2 discharge capacity during formation was very low (<50 mAh/g). These cells showed essential no charge and discharge capacity during subsequent discharge and charging cycles at 55° C. By comparison, the Example 2 cells containing the fluorinated solvent, fluorosulfone, and fluoroethylene carbonate showed a cycle 2 discharge capacity during formation of ~100 mAh/g. Subsequent cycling at 55° C. showed that these batteries possess a cycle life retention to 80% capacity of greater than 48 cycles.

Example 3

HVLS Pouch Cells

Preparation of High Voltage Layered-Spinel (HVLS) Electroactive Cathode Material 397.2 g of MnO$_2$ (Alfa Aesar 42250), 101.2 g NiO (Alfa Aesar 12359) 11.9 g Fe$_2$O$_3$ (Aldrich 310030) and 117.7 g of Li$_2$CO$_3$ (Alfa Aesar 13418) were added to a UHMWPE vibratory milling pot, along with 5 kg of 10 mm cylinder yttria-stabilized zirconia media and 625 g of acetone. The pot was sealed and low amplitude vibratory milled on a Sweco mill for 40.5 hours. Then 50 g of LiCl (Alfa Aesar 36217) was added to the pot and the mixture was milled for an additional 3 hours. The mixed powder was separated from the acetone by vacuum filtration through a nylon membrane and dried. The dry cake was then placed in a poly bag and tapped with a rubber mallet to break up or pulverize any large agglomerates. The resulting powder was packed into a 750 mL alumina tray, covered with an alumina plate and fired in a box furnace with the following heating protocol: 25° C. to 900° C. in 6 hours; dwell at 900° C. for 6 hours; cool to 100° C. in 15 hours.

Once the fired material was at room temperature, it was again placed in a poly bag and tapped with a rubber mallet. Then it was transferred to a 1 gallon (3.78 L) poly jug and slurried with 1 L of deionized water. The jug was placed in an ultrasonic bath for 15 minutes to aid dissolution of LiCl. Following this procedure, material was filtered using a 3 L fine glass frit Buchner funnel, and rinsed with 21 L of deionized water to remove any residual lithium chloride. The filter cake was rinsed with 150 mL of isopropyl alcohol to remove the water, and partially dried. The filter cake was transferred to a 1 gallon (3.78 L) poly bottle with 500 g of isopropanol (IPA), and 2 kg of 10 mm cylinder yttria-stabilized zirconia media for particle size reduction. The bottle was tumbled for 90 minutes on a set of rollers, then filtered through the same glass Buchner funnel to remove the IPA. Finally the powder was dried in a vacuum oven overnight at 70° C. The $0.03Li_2MnO_3$-$0.97LiMn_{1.5}Ni_{0.45}Fe_{0.05}O_4$ HVLS composite thus prepared was used as the cathode active material for Example 3.

Silicate Primed Aluminum Foil

The following were combined in an Erlenmeyer flask:

| | |
|---|---|
| 1.0 g | carbon black (C65, Timcal) |
| 13.6 g | lithium polysilicate solution, 20% by weight in water (Sigma Aldrich) |
| 0.023 g | Triton X-100 detergent |
| 75 g | water |

The suspension was stirred with a magnetic stirrer at 500 rpm for min, followed by rotor/stator disperser for 5 min at 10,000 rpm. The suspension was sprayed onto aluminum current collector foils (25 μm thick, 1145-0, Allfoils, Brooklyn Heights, Ohio) and dried under ambient temperature to give a deposit of about 0.07 mg/cm².

Electrodes

A HVLS cathode was prepared in a similar manner as the Fe-LNMO cathode described above, except the current collector was the silicate primed aluminum foil described above, the dried cathode composition was HVLS:PVDF:carbon black 90:5:5 wt:wt:wt, and the carbon black was C•Nergy™ Super C65 (Timcal, Westlake, Ohio). The cathodes were calendered at 125° C. between steel rolls to 35% porosity and had 9.1 mg HVLS/cm² loading. Anodes were graphite:pVDF:carbon black (88:7:5 wt:wt:wt) coated on a copper foil current collector. The graphite was G5 (CPreme® G5, Conoco-Philips, Huston, Tex.); the carbon black was C65. The anode coating weight was 4.7 mg graphite/cm² and the anodes were calendered to a thickness of 46 μm.

Electrolyte Preparation

For Example 3, the electrolyte composition was prepared by combining 35 weight percent 2,2-difluoroethyl acetate (DFEA), 35 weight percent difluoromethyl methyl sulfone (DFMS), and 30 weight percent ethylene carbonate (EC, BASF, Independence, Ohio) in a nitrogen purged drybox. Molecular sieves (3A) were added and the mixture was dried to less than 1 ppm water. After filtration with a 0.25 micron PTFE syringe filter, sufficient $LiPF_6$ (lithium hexafluorophosphate, BASF, Independence, Ohio) was added to make the composition 1 M in $LiPF_6$. Then, 96 parts by weight of this composition were combined with 2 parts by weight of fluoroethylene carbonate and 2 parts by weight of LiBOB to form the final electrolyte composition.

Pouch Cells

Cathodes were punched out to 31.3 mm×45 mm size and anodes were punched out to 32.4 mm×46.0 mm size. Al and Ni tabs were ultrasonically welded to the current collectors, and single-layer pouch cells were assembled using a foil-polymer laminate pouch material (C4-480ST, Showa Denko Packaging Corp, Osaka, Japan). The tabs were sealed into the top of the pouch outside the dry box, leaving the two sides and bottom open. The pouch was dried in the antechamber of a dry box under vacuum overnight at 90° C. Inside the argon-filled dry box, a microporous polyolefin separator (Celgard 2500, Charlotte, N.C.) was placed between the anode and cathode, and the sides sealed. The electrolyte (350 μL) was injected through the bottom, and the bottom edge sealed in a vacuum sealer. The cells were mounted in fixtures which applied 0.32 MPa pressure via a foam pad to the active area of the pouch.

The cells were placed in an environmental chamber at 25° C. and subjected to two formation cycles between voltage limits of 3.4-4.9 V using constant currents (CC) of 12 mA per g of cathode active material. The cells were then cycled twice at 3.4-4.9 V using CC charges at 40 mA/g plus a current taper at constant voltage (CV) to 2.4 mA/g, and CC discharges of 40 mA/g without CV. Cell capacities were calculated from the second CC discharge of 40 mA/g without CV. The cells were then cycled five times with both charges and discharges at 240 mA/g. The pouch cells were then placed in an oven at 55° C. and cycled at a current of 240 mA per gram of cathode material, which is approximately a 2 C rate. Table 3 gives the electrolyte composition, the specific capacity in the 10 second discharge at 55° C. in mAh per gram of HVLS, and the number of cycles at 55° C. before the discharge capacity declined below 80% of the capacity from the second discharge at 55° C.

TABLE 3

Pouch Cell Formation and Cycling Results for Example 3

| Example | Electrolyte Composition | Pouch Cell | Specific Capacity $2^{nd}$ Discharge (mAh/g) | Cycle Life 80% |
|---|---|---|---|---|
| Ex. 3 | 35% DFEA, 35% DFMS, 30% EC, 1M $LiPF_6$, 2% FEC, 2% LiBOB | 3-1 3-2 | 114 116 | 311 273 |

Example 4 and

Comparative Example D

NMC532 Pouch Cells

For Example 4 and Comparative Example D, the cathode paste was made using the following materials:

| | |
|---|---|
| 0.52 g | carbon black (Super C65, Timcal, Westlake, OH) |
| 10.4 g | solution of 5% PVDF (Solef® 5130, Solvay, West Deptford, NJ) in NMP (N-methylpyrrolidone (Sigma-Aldrich, Milwaukee, WI)) |

| | |
|---|---|
| 3.0 g | NMP |
| 9.36 g | NMC 532 (approx. $LiNi_{0.5}Mn_{0.3}Co_{0.2}O_2$, Jinhe Ningbo, China) |

The carbon black, PVDF solution, and NMP were first combined in a plastic vial and centrifugally mixed (ARE-310, Thinky USA, Inc., Laguna Hills, Calif.) two times for 60 s at 2000 rpm each time. The cathode active powder NMC 532 was added and the paste was centrifugally mixed two times (2×1 min at 2000 rpm). The paste was further mixed using a rotor-stator homogenizer (model PT 10-35 GT, 9 mm diameter rotor, Kinematicia, Bohemia, N.Y.). The paste was homogenized for 5 min at 9500 rpm. During this time the vial was moved to bring the various portions of the paste into contact with the homogenizer rotor blade. Bubbles were removed using the centrifugal mixer. The paste was cast using a doctor blade (102 mm wide×0.29 mm gate height, Bird Film Applicator Inc., Norfolk, Va.) onto aluminum foil (not primed, 25 µm thick, 1145-0, Allfoils, Brooklyn Heights, Ohio) using an electric-drive coater (Automatic Drawdown Machine II, Paul N. Gardner Co., Pompano Beach, Fla.). The electrodes were dried for 30 min in a mechanical convection oven (model FDL-115, Binder Inc., Great River, N.Y.). The temperature in the oven was increased from 80° C. to 100° C. during the first 15 min, and held at 100° C. for the second 15 minutes. After drying the composition of the cathode was 90:5:5 wt:wt:wt NMC: pVDF:black. The cathode was placed between brass cover sheets and calendered between 100 mm diameter steel rolls to give 57 µm thick cathodes with porosity of approximately 34% and loading of 14 mg $NMC/cm^2$.

For Example 4 and Comparative Example D, the anodes were the same as used in Example 3, except that the coating weight was increased to 8.5 mg $graphite/cm^2$.

Electrolyte Preparation

For Example 4, the electrolyte composition was prepared by combining 28 weight percent 2,2-difluoroethyl acetate (DFEA), 28 weight percent difluoromethyl methyl sulfone (DFMS), 14 weight percent dimethyl carbonate (DMC, BASF, Independence, Ohio), and 30 weight percent fluoroethylene carbonate (FEC, BASF, Independence, Ohio) in a nitrogen purged drybox. Molecular sieves (3A) were added and the mixture was dried to less than 1 ppm water. After filtration with a 0.25 micron PTFE syringe filter, sufficient $LiPF_6$ was added to make the final electrolyte composition 1 M in $LiPF_6$.

For Comparative Example D, the electrolyte composition was prepared by combining 70 weight percent 2,2-difluoroethyl acetate and 30 weight percent ethylene carbonate in a nitrogen purged drybox. Molecular sieves (3A) were added and the mixture was dried to less than 1 ppm water. After filtration with a 0.25 micron PTFE syringe filter, sufficient $LiPF_6$ was added to make the final electrolyte composition 1 M in $LiPF_6$.

Pouch cell fabrication and mounting in fixtures used the same methods as described for Example 3. The cells were held in a 25° C. environmental chamber and evaluated using a battery tester (Series 4000, Maccor, Tulsa, Okla.). In the following procedure, the currents for the C-rates were determined assuming the cell would have a capacity of 170 mAh per g of NMC. Thus currents of 0.05 C, 0.25 C, and 1.0 C were implemented in the tester using, respectively, currents of 8.5, 42.5, and 170 mA per gram of NMC in the cell.

The steps of the procedure were as follows:
1. Overnight wetting at open circuit (OC)
2. 1st charge
3. Aging at OC
4. Bring cell in dry box, open to release formation gas, vacuum reseal
5. Finish remainder of 1st charge
6. Discharge CC at 0.5 C to 3.0V
7. 2nd Cycle: Charge CC of 0.2 C to 4.35V+CV to 0.05 C: Discharge CC at 0.2 C to 3.0V
8. 3th-6th cycles: Charge CC at 170 mA/g~1 C to 4.35V+CV to 8.5 mA/g; Discharge CC at 1.0 C to 3.0V
9. 7th Charge CC at 1.C 4.35V+CV to 0.05 C
10. Store cell at 90° C. for 4 h
11. Discharge the cell, then perform two charge/discharge cycles (Cycles 8 and 9) as in Step 7. The recovered capacity is the ratio of Cycle 9 discharge capacity/Cycle 2 discharge capacity

TABLE 4

NMC 532 Pouch Cell Formation and Storage Results for Example 4 and Comparative Example D

| Example | Electrolyte Composition | Pouch Cell | Specific Capacity $2^{nd}$ Discharge (mAh/g) | Recovered Capacity (%) |
|---|---|---|---|---|
| Ex. 4 | 28% DFEA, 28% DFMS, 14% DMC, 30% FEC, 1M $LiPF_6$ | 4-1 | 172 | 88.2 |
|  |  | 4-2 | 172 | 88.7 |
| Comp. Ex. D | 70% DFEA, 30% EC, 1M $LiPF_6$ | D-1 | 165 | 75.6 |

The pouch cells of Example 4, which contained an electrolyte composition of fluorinated sulfone DFMS, fluorinated solvent DFEA, non-fluorinated carbonate DMC, fluorinated cyclic carbonate FEC, and $LiPF_6$ gave higher capacity in the second discharge after formation, and higher recovered capacity after storage at elevated temperature, than Comparative Example D pouch cell which contained an electrolyte composition of the fluorinated solvent DFEA and the non-fluorinated cyclic carbonate EC, with $LiPF_6$.

What is claimed is:
1. An electrolyte composition comprising:
a) a fluorinated solvent which is a fluorinated acyclic carboxylic acid ester represented by Formula (I):

$$R^1—COO—R^2 \qquad (I)$$

wherein
i) $R^1$ is H, an alkyl group, or a fluoroalkyl group;
ii) $R^2$ is an alkyl group or a fluoroalkyl group;
iii) either or both of $R^1$ and $R^2$ comprises fluorine;
iv) $R^1$ and $R^2$ comprise at least two carbon atoms but not more than seven carbon atoms;
b) a fluorinated sulfone represented by Formula (V):

$$CF_2H—R^9—SO_2—R^{10} \qquad (V)$$

wherein $R^9$ is optionally absent, or a $C_1$ to $C_{10}$ alkylene group, or a $C_1$ to $C_{10}$ fluoroalkylene group, each group optionally comprising one or more ether oxygens; and $R^{10}$ is a $C_1$ to $C_{10}$ alkyl group or a $C_1$ to $C_{10}$ fluoroalkyl group, each optionally comprising one or more ether oxygens;
c) at least one component selected from
i) a borate salt represented by Formula (IX)

$$LiBF_{(4-2p)}(C_2O_4)_p \qquad (IX)$$

wherein p is 0, 1, or 2; and/or
ii) an oxalate salt represented by Formula (X)

$$LiBF_{(6-2q)}(C_2O_4)_q \quad (X)$$

wherein q is 1, 2, or 3; and/or
iii) a fluorinated cyclic carbonate; and
d) at least one electrolyte salt.

2. The electrolyte composition of claim 1, wherein $R^1$ and $R^2$, further comprise at least two fluorine atoms, with the proviso that neither of $R^1$ or $R^2$ contains a $FCH_2$— group or a —FCH— group.

3. The electrolyte composition of claim 1, wherein the fluorinated acyclic carboxylic acid ester comprises $CH_3$—COO—$CH_2CF_2H$, $CH_3CH_2$—COO—$CH_2CF_2H$, $F_2CHCH_2$—COO—$CH_3$, $F_2CHCH_2$—COO—$CH_2CH_3$, $CH_3$—COO—$CH_2CH_2CF_2H$, $CH_3CH_2$—COO—$CH_2CH_2CF_2H$, $F_2CHCH_2CH_2$—COO—$CH_2CH_3$, $CH_3$—COO—$CH_2CF_3$, $CH_3CH_2$—COO—$CH_2CF_2H$, H—COO—$CH_2CF_2H$, H—COO—$CH_2CF_3$, or mixtures thereof.

4. The electrolyte composition of claim 3, wherein the fluorinated acyclic carboxylic acid ester comprises 2,2-difluoroethyl acetate.

5. The electrolyte composition of claim 1, wherein the fluorinated sulfone comprises $CHF_2SO_2CH_3$, $CHF_2SO_2CH_2CH_3$, $CHF_2CH_2SO_2CH_3$, $CHF_2CH_2SO_2CH_2CH_3$, $CHF_2CH_2SO_2CH(CH_3)_2$, $(CHF_2CH_2)_2SO_2$, $CH_2FSO_2CH_3$, $CH_2FSO_2CH_2CH_3$, $CH_2FCH_2SO_2CH_3$, $CH_2FCH_2SO_2CH_2CH_3$, $CH_2FCH_2SO_2CH(CH_3)_2$, $(CH_2FCH_2)_2SO_2$, $CHF_2CF_2SO_2CH_3$, or mixtures thereof.

6. The electrolyte composition of claim 1, further comprising a non-fluorinated sulfone and/or at least one non-fluorinated cyclic or acyclic carbonate.

7. The electrolyte composition of claim 1, wherein the borate salt comprises lithium bis(oxalato)borate; the oxalate salt comprises lithium tris(oxalato)phosphate; and/or the fluorinated cyclic carbonate comprises 4-fluoro-1,3-dioxolan-2-one; 4,5-difluoro—1,3-dioxolan-2-one; 4,5-difluoro-4-methyl-1,3-dioxolan-2-one; 4,5-difluoro-4,5-dimethyl-1,3-dioxolan-2-one; 4,4-difluoro-1,3-dioxolan-2-one; 4,4,5-trifluoro-1,3-dioxolan-2-one, or mixtures thereof.

8. The electrolyte composition of claim 1, wherein the electrolyte composition comprises about 0.001 weight percent to about 15 weight percent of the borate salt, the oxalate salt, or a combination thereof, based on the total weight of the electrolyte composition. The electrolyte composition of claim 1, wherein the electrolyte composition comprises about 0.1 weight percent to about 60 weight percent of the fluorinated cyclic carbonate, based on the total weight of the electrolyte composition.

9. The electrolyte composition of claim 1, wherein the electrolyte composition comprises about 0.1 weight percent to about 60 weight percent of the fluorinated cyclic carbonate, based on the total weight of the electrolyte composition.

10. The electrolyte composition of claim 1, wherein the electrolyte composition comprises about 10% to about 90% 2,2-difluoroethyl acetate, about 0.1% to about 50% difluoromethyl methyl sulfone, and about 0.001% to about 15% of the borate salt by weight of the electrolyte composition.

11. An electrochemical cell comprising:
(a) a housing;
(b) an anode and a cathode disposed in the housing and in ionically conductive contact with one another;
(c) the electrolyte composition of claim 1 disposed in the housing and providing an ionically conductive pathway between the anode and the cathode; and
(d) a porous separator between the anode and the cathode.

12. The electrochemical cell of claim 11, wherein the electrochemical cell is a lithium ion battery.

13. The electrochemical cell of claim 12, wherein the cathode comprises a cathode active material exhibiting greater than 30 mAh/g capacity in the potential range greater than 4.6 V versus a $Li/Li^+$ reference electrode, or a cathode active material which is charged to a potential greater than or equal to 4.35 V versus a $Li/Li^+$ reference electrode.

14. The electrochemical cell of claim 12, wherein the cathode comprises:
a) a lithium-containing manganese composite oxide having a spinel structure as active material, the lithium-containing manganese composite oxide being represented by the formula:

$$Li_xNi_yM_zMn_{2-y-z}O_{4-d},$$

wherein x is 0.03 to 1.0; x changes in accordance with release and uptake of lithium ions and electrons during charge and discharge; y is 0.3 to 0.6; M comprises one or more of Cr, Fe, Co, Li, Al, Ga, Nb, Mo, Ti, Zr, Mg, Zn, V, and Cu; z is 0.01 to 0.18, and d is 0 to 0.3; or
b) a composite material represented by the structure of Formula:

$$x(Li_{2-w}A_{1-v}Q_{w+v}O_{3-e})\cdot(1-x)(Li_yMn_{2-z}M_zO_{4-d})$$

wherein:
x is about 0.005 to about 0.1;
A comprises one or more of Mn or Ti;
Q comprises one or more of Al, Ca, Co, Cr, Cu, Fe, Ga, Mg, Nb, Ni, Ti, V, Zn, Zr or Y;
e is 0 to about 0.3;
v is 0 to about 0.5;
w is 0 to about 0.6;
M comprises one or more of Al, Ca, Co, Cr, Cu, Fe, Ga, Li, Mg, Mn, Nb, Ni, Si, Ti, V, Zn, Zr or Y;
d is 0 to about 0.5;
y is about 0 to about 1; and
z is about 0.3 to about 1; and
wherein the $Li_yMn_{2-z}M_zO_{4-d}$ component has a spinel structure and the $Li_{2-w}Q_{w+v}A_{1-v}O_{3-e}$ component has a layered structure; or
c) $Li_aMn_bJ_cO_4Z_d$,
wherein:
J is Ni, Co, Mn, Cr, Fe, Cu, V, Ti, Zr, Mo, B, Al, Ga, Si, Li, Mg, Ca, Sr, Zn, Sn, a rare earth element, or a combination thereof; Z is F, S, P, or a combination thereof; and
$0.9 \leq a \leq 1.2$, $1.3 \leq b \leq 2.2$, $0 \leq c \leq 0.7$, $0 \leq d \leq 0.4$; or
d) $Li_aNi_bMn_cCo_dR_eO_{2-f}Z_f$,
wherein:
R is Al, Ni, Co, Mn, Cr, Fe, Mg, Sr, V, Zr, Ti, a rare earth element, or a combination thereof;
Z is F, S, P, or a combination thereof; and
$0.8 \leq a \leq 1.2$, $0.1 \leq b \leq 0.9$, $0.0 \leq c \leq 0.7$, $0.05 \leq d \leq 0.4$, $0 \leq e \leq 0.2$; wherein the sum of b+c+d+e is about 1; and $0 \leq f \leq 0.08$; or
e) $Li_aA_{1-b}R_bD_2$,
wherein:
A is Ni, Co, Mn, or a combination thereof;
R is Al, Ni, Co, Mn, Cr, Fe, Mg, Sr, V, Zr, Ti, a rare earth element, or a combination thereof;
D is O, F, S, P, or a combination thereof; and
$0.90 \leq a \leq 1.8$ and $0 \leq b \leq 0.5$.

15. The electrochemical cell of claim 12, wherein the cathode comprises:
$Li_aA_{1-x}R_xDO_{4-f}Z_f$, wherein:
A is Fe, Mn, Ni, Co, V, or a combination thereof;
R is Al, Ni, Co, Mn, Cr, Fe, Mg, Sr, V, Zr, Ti, a rare earth element, or a combination thereof;
D is P, S, Si, or a combination thereof;
Z is F, Cl, S, or a combination thereof;
$0.8 \leq a \leq 2.2$;
$0 \leq x \leq 0.3$; and
$0 \leq f \leq 0.1$.

16. An electronic device, transportation device, or telecommunication device, comprising an electrochemical cell according to claim 11.

* * * * *

UNITED STATES PATENT AND TRADEMARK OFFICE
CERTIFICATE OF CORRECTION

| | | |
|---|---|---|
| PATENT NO. | : 11,374,260 B2 | Page 1 of 1 |
| APPLICATION NO. | : 16/305438 | |
| DATED | : June 28, 2022 | |
| INVENTOR(S) | : Stephen E. Burkhardt et al. | |

It is certified that error appears in the above-identified patent and that said Letters Patent is hereby corrected as shown below:

In the Claims

In Claim 8, Column 35, Lines 46 to 50, "The electrolyte composition of claim 1, wherein the electrolyte composition comprises about 0.1 weight percent to about 60 weight percent of the fluorinated cyclic carbonate, based on the total weight of the electrolyte composition" should be removed.

Signed and Sealed this
Seventeenth Day of October, 2023

Katherine Kelly Vidal
*Director of the United States Patent and Trademark Office*